(12) United States Patent
Morita et al.

(10) Patent No.: US 11,767,382 B2
(45) Date of Patent: Sep. 26, 2023

(54) RESIN COMPOSITION AND MOLDING METHOD THEREOF

(71) Applicant: Hemicellulose Ltd., Kanagawa (JP)

(72) Inventors: Seiji Morita, Tokyo (JP); Jin Nasukawa, Tokyo (JP); Kenichi Sato, Tokyo (JP); Laksmi Kusumawardhani, Tokyo (JP)

(73) Assignee: Hemicellulose Ltd., Kanagawa (JP)

( * ) Notice: Subject to any disclaimer, the term of this patent is extended or adjusted under 35 U.S.C. 154(b) by 624 days.

(21) Appl. No.: 16/704,238

(22) Filed: Dec. 5, 2019

(65) Prior Publication Data

US 2020/0270379 A1 Aug. 27, 2020

(30) Foreign Application Priority Data

Feb. 22, 2019 (JP) .................... 2019-030379

(51) Int. Cl.
| | |
|---|---|
| *C08F 120/68* | (2006.01) |
| *C08L 33/14* | (2006.01) |
| *B29C 45/00* | (2006.01) |
| *B29C 45/73* | (2006.01) |
| B29K 33/00 | (2006.01) |
| B29C 45/56 | (2006.01) |

(52) U.S. Cl.
CPC ........ *C08F 120/68* (2013.01); *B29C 45/0001* (2013.01); *B29C 45/7331* (2013.01); *C08L 33/14* (2013.01); *B29C 45/561* (2013.01); *B29C 2945/76361* (2013.01); *B29K 2033/12* (2013.01)

(58) Field of Classification Search
None
See application file for complete search history.

(56) References Cited

U.S. PATENT DOCUMENTS

2011/0190402 A1* 8/2011 Linhardt ............. C09D 101/02
106/163.01

OTHER PUBLICATIONS

Iwata et al. Synthesis and characterization of xylan esters (Year: 2012).*
Fundadore et al. Enhanced crystallization of poly(d-lactide) by xylan esters (Year: 2013).*

* cited by examiner

*Primary Examiner* — Ronak C Patel
(74) *Attorney, Agent, or Firm* — Alix, Yale & Ristas, LLP

(57) ABSTRACT

A resin composition for molding having excellent heat resistance, hardness, cost-effectiveness, and biodegradability is provided by using an amorphous resin material component extracted from plant-derived wood. The resin composition is a hemicellulose monomer obtained by applying a methacrylation reaction or acrylation reaction to a hemicellulose or hemicellulose derivative and has a molecular structure in which a methacrylic group or acryloyl group is bonded to the hemicellulose or hemicellulose derivative. This hemicellulose monomer has excellent injection moldability.

20 Claims, 2 Drawing Sheets

RESIN COMPOSITION AND MOLDING METHOD THEREOF

TECHNICAL FIELD

The present invention relates to a resin composition and injection molding method thereof. In particular, the present invention relates to a resin composition for molding having biodegradability and molding method thereof.

BACKGROUND

Chemically synthesized plastics, such as PP, PE, PET, PC, PMMA, PS, COP, and COC, have been used as resin materials for molding. Although these chemically synthesized plastics produce carbon dioxide and pose environmental pollution problems, such problems are nearly neglected when synthesized plastics are used.

Under such circumstances, resin compositions have been developed so that they do not produce carbon dioxide during preparation thereof and are made of a component of a natural material, such as a plant. Also, biodegradable resin compositions have been developed so that they are biodegraded into low-molecular compounds not to have adverse effects on the environment by microorganisms. Examples of such a plant-derived, biodegradable resin composition include polylactic acid (PLA). A molded product made of polylactic acid is disclosed in Japanese Unexamined Patent Application Publication No. 2016-179694.

SUMMARY

PLA is made from corn or sugarcane and therefore produces less $CO_2$. However, it requires many preparation processes and high preparation cost. Also, PLA is a material that biodegrades only at high temperatures of 50 degrees Celsius or more. For this reason, PLA cannot exhibit biodegradability when disposed of in the natural environment. Also, PLA is less heat resistant and therefore a molded product made of PLA, for example, a drink container such as a cup, is deformed when hot water is poured thereinto. Also, a molded product made of PLA has less strength and therefore is cracked, damaged, or broken when it falls or is bent or pressed. When producing a molded product from PLA by injection molding, a longer molding cycle time is required or a molding failure is more likely to occur due to poor fluidity of PLA problem in terms of mass production of molded products. That is, conventional resin compositions including PLA are problematic in terms of heat resistance, hardness, cost-effectiveness, and biodegradability.

The present inventors conducted intensive research and, as a result, here provide a resin composition for molding having excellent heat resistance, hardness, cost-effectiveness, and biodegradability by using an amorphous resin material component extracted from plant-derived wood. The present inventors also provide a molding method of this resin composition.

A resin composition of the present embodiment is a first resin that is derived from a plant and has the following structural formula (Chemical Formula 1).

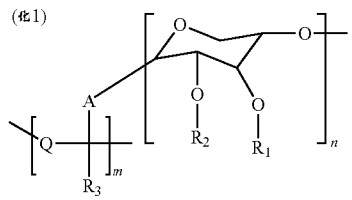

[Chemical Formula 1]

The resin composition may include a second resin having the following structural formula (Chemical Formula 2).

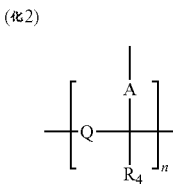

[Chemical Formula 2]

The resin composition for molding may include a second resin including one of polycarbonate (PC), cyclo olefin polymer (COP), cyclo olefin copolymer (COC), polypropylene (PP), polyethylene (PE), polyethylene terephthalate (PET), polystyrene (PS), ABS resin (ABS), vinyl chloride (PVC), vinylidene chloride (PVDC), vinyl acetate (PVAC), polymethylpentene (PMP), polybutene (PB), hydroxybenzoic acid (HBP), polyetherimide (PEI), polyacetal (POM), polyphenylene ether (PPE), polyphenylene oxide (PPO), polyphenylene sulfide (PPS), polyurethane (PUR), ionomer resin (IO), fluorocarbon resin (FR), tetrafluoroethylene (PTFE), polycyclohexylenedimethylene terephthalate (PCT), polyethylene naphthalate (PEN), polyarylate (PAR), polyacrylonitrile (PAN), polyallylsulfone (PASF), polyamide (PA), polyvinyl alcohol (PVA), polymethacrylstyrene (MS), butadiene resin (BDR), polybutylene terephthalate (PBT), polyester carbonate (PPC), polybutylene succinate (PBS), norbornene resin (NB), polyamide (nylon) (PA), Teflon®, FRP, PHA, PHB, PHBH, CA, polyimide (PI), polyamideimide (PAI), polysulfone (PSF), polyethersulfone (PES), polyetheretherketone (PEEK), liquid crystal polymer (LCP), polychlorotrifluoroethylene (PCTFE), silicone resin (SI), epoxy resin (EP), and polylactic acid (PLA), or two or more thereof.

Wood powder or wood pellets, bamboo powder or bamboo pellets, or a grass powder or grass pellets obtained by freezing and crushing wood, bamboo, or grass; or a paper powder or paper pellets obtained by freezing and crushing paper may be kneaded with the first resin, or may be kneaded with the first and second resins. As these materials are very inexpensive, the cost of resin pellets and the price of molded products are expected to be reduced. When the wood powder or wood pellets, bamboo powder or bamboo pellets, grass powder or grass pellets, or paper powder or paper pellets is directly mixed with the second resin, the resin composition decreases in heat resistance, strength, and fluidity. On the other hand, by kneading those materials with the first resin, the resin composition improves in heat resistance, strength, and fluidity and obtains biodegradability.

The resin composition may include a second resin having the following structural formula (Chemical Formula 3).

[Chemical Formula 3]

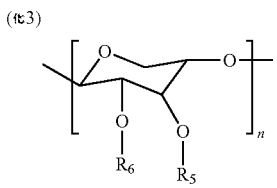

It is preferable that the resin composition includes 10 to 90 percent by weight of the first resin and 90 to 10 percent by weight of the second resin. Preferably, one or more of R1 and R2 is an acetyl group, an acetonyl group, or a carboxyl group, the second resin includes one or more of polymethyl methacrylate, polycarbonate, polyethylene, polypropylene and polyethylene terephthalate, and the resin composition includes 10 to 90 percent by weight of the first resin and 90 to 10 percent by weight of the second resin.

A resin composition molding method of the present embodiment includes a step of charging the above-mentioned resin composition into a resin injector with the resin composition solidified, a step of liquidizing the resin composition in the resin injector by heating and compressing the resin composition, a step of injecting the liquidized resin composition from the resin injector into a mold by pressing the resin composition, and a step of cooling and solidifying the resin composition in the mold and extracting a molded product from the mold. It is preferable that the resin composition molding method further includes a step of introducing a gas into the liquidized resin composition to disperse the gas in the resin composition.

The resin composition of the present invention has excellent heat resistance, hardness, cost-effectiveness, and biodegradability.

DETAILED DESCRIPTION

Hemicellulose and Hemicellulose Polymer

Figure 1A:
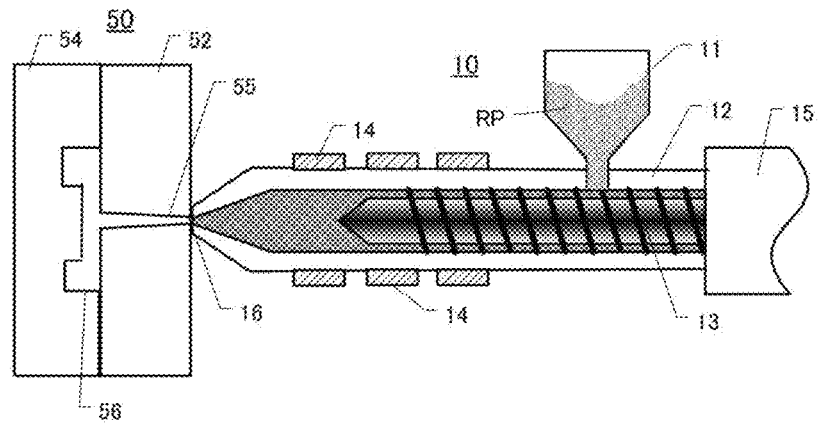
FIGS. 1A to 1C are concept drawings that shows production of an injection-molded product using an injection molding machine and a mold (without a gas)

A resin composition of the present embodiment includes a plant-derived resin component. This resin component is one of the main components of a tree. That is, a tree includes three main components: cellulose, hemicellulose, and lignin. A hemicellulose is amorphous and has very high uniformity. A melted liquid hemicellulose has high fluidity and is suitable as a material for injection molding. Cellulose is a fibrous material having high crystallinity and is not suitable as a main component of a material for injection molding. Lignin is a material having high crystallinity and less fluidity and therefore is not suitable as a main component of a material for injection molding. A hemicellulose alone is an amorphous material, and a liquidized hemicellulose can uniformly flow through a cylinder during injection molding.

Hemicelluloses include complex polysaccharides, such as mannan, glucan, xylan, and xyloglucan. The hemicellulose of the present embodiment may be any of these substances and may contain a small amount of cellulose or a small amount of lignin. Among hemicelluloses, xylan is preferably used. A typical hemicellulose has a molecular weight of (weight average molecular weight Mw) 1,000 to 100,000. If a hemicellulose having a molecular weight of 30,000 to 100,000 is injection-molded, a molded product having good strength is obtained.

A hemicellulose has good biodegradability. A hemicellulose biodegrades at a higher rate than cellulose and lignin and favorably biodegrades at low to high temperatures, for example, at a low temperature of 5 degrees Celsius. A hemicellulose is biodegraded by microorganisms at ordinary temperature and becomes water and carbon dioxide after three months. For example, when buried in soil, a hemicellulose is biodegraded by microorganisms in soil. A hemicellulose is also biodegraded by microorganisms in seawater. A hemicellulose is a material in harmony with the environment.

A hemicellulose is a component of wood and therefore chemical synthesis is not required to obtain a hemicellulose. That is, a hemicellulose does not produce carbon dioxide, which occurs when chemically synthesizing a raw material, and plant-derived wood consumes carbon dioxide by photosynthesis.

A hemicellulose has the following structural formula. Any hemicellulose having the following structure in its molecular structure can be used in the present embodiment.

[Chemical Formula 3]

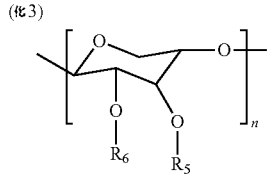

R5 and R6 each represent a substituent group. R5 and R6 are each nitrogen, an alkyl group, an acetyl group, a hydroxy group, an acyl group, an aldehyde group, an amino group, an imino group, an aryl group, a phosphonyl group, a propenyl group, a propanyl group, an acetonyl group, a carbonyl group, a carboxyl group, a cyano group, an azo group, an azi group, a thiol group, a sulfo group, a nitro group, a vinyl group, an allyl group, a cycloalkyl group, a phenyl group, a naphthyl group, an aralkyl group, a benzyl group, a Schiff group, an alkylene group, an amyl group, an acetamidomethyl group, an adamantyl group, an adamantyloxycarbonyl group, an allyloxycarbonyl group, a tert-butoxycarbonyl group, a benzyloxymethyl group, a biphenylisopropyloxycarbonyl group, a benzoyl group, a benzyloxycarbonyl group, a cyanoethyl group, a cyclohexyl group, a carboxymethyl group, a cyclopentadienyl group, a pentamethylcyclopentadienyl group, a cyclohexyl group, glucose, a hexyl group, an isobutyl group, an isopropyl group, a mesityl group, a trimethylphenyl group, a methoxymethyl group, a mesitylenesulfonyl group, a mesyl group, a nosyl group, an octadecylsilyl group, a pivaloyl group, a methoxybenzyl group, a methoxyphenyl group, a propyl group; an ethoxymethyl group, a trimethylsilyl group, a trimethylsilylethoxymethyl group, a siamyl group, a tert-butyl group, a tert-butyldimethylsilyl group, a tert-butyldiphenylsilyl group, a tert-butyldimethylsilyl group, a triethylsilyl group, a tetrahydropyranyl group, a triisopropylsilyl group, a trimethylsilyl group, a tolyl group, a tosyl group, a triisopropylbenzenesulfonyl group, a trityl group, a trichloroethoxycarbonyl group, a benzyloxycarbonyl group, a methylene group, a valeryl group, a methoxy group, an acetamide group, a trimethylammonium group, a diazo group, a hydrocarbon group, or the like, but are not limited thereto. R5 and R6 may be each a substituent group having any of these substances in the structure. R5 and R6 may be each fluorine, bromine, chlorine, iodine, or the like, or may be each a substituent group having any of these substances in the structure. R5 and R6 may be each an ionized substituent group, such as a cation or anion, that forms an ionic liquid structure, or may be each a substituent group having such a substance in the structure. R5 and R6 may be different substituent groups.

A hemicellulose having such a basic structure provides the resin composition with biodegradability, as well as heat resistance, strength, fluidity, and transparency. Such a resin composition can be injection-molded, and an injection-molded product has biodegradability, as well as good heat resistance, strength, fluidity, and transparency. n is an integer greater than or equal to 2. As will be described later, a hemicellulose component extracted from a wood chip includes hydrogen as R5 and R6 and is called a "hemicellulose." A hemicellulose has high hydrophilicity and therefore easily captures moisture. A molded product including a hemicellulose, which has high water absorbency, may be unpreferable, since the size, volume, or weight thereof is more likely to vary with time, depending on the application. Also, such a molded product decreases in strength, transparency, or heat resistance, depending on the application. To solve these problems associated with water absorbency, it is preferred to change R in the molecule of the hemicellulose to a substituent group as description above, that is, a substituent group, such as an acetyl group, an acetonyl group, or an ionized substituent group. Hemicelluloses whose R has been substituted by various substituent groups other than hydrogen are called "hemicellulose derivatives." A typical hemicellulose derivative includes acetyl groups as R5 and R6.

A hemicellulose polymer that is a first resin of the present embodiment has a molecular structure in which a hemicellulose or a hemicellulose derivative and another resin are bonded together, and has the following structural formula. Any hemicellulose polymer having the following structure in its molecular structure can be used in the present embodiment.

[Chemical Formula 1]

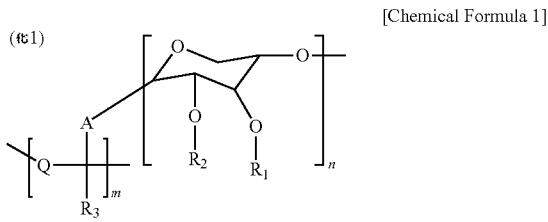

R1, R2, and R3 each represent a substituent group. R1, R2, and R3 each represent hydrogen, nitrogen, an alkyl group, an acetyl group, a hydroxy group, an acyl group, an aldehyde group, an amino group, an imino group, an aryl group, a phosphonyl group, a propenyl group, a propanyl group, an acetonyl group, a carbonyl group, a carboxyl group, a cyano group, an azo group, an azi group, a thiol group, a sulfo group, a nitro group, a vinyl group, an allyl group, a cycloalkyl group, a phenyl group, a naphthyl group, an aralkyl group, a benzyl group, a Schiff group, an alkylene group, an amyl group, an acetamidomethyl group, an adamantyl group, an adamantyloxycarbonyl group, an allyloxycarbonyl group, a tert-butoxycarbonyl group, a benzyloxymethyl group, a biphenylisopropyloxycarbonyl group, a benzoyl group, a benzyloxycarbonyl group, a cyanoethyl group, a cyclohexyl group, a carboxymethyl group, a cyclopentadienyl group, a pentamethylcyclopentadienyl group, a cyclohexyl group, glucose, a hexyl group, an isobutyl group, an isopropyl group, a mesityl group, a trimethylphenyl group, a methoxymethyl group, a mesitylenesulfonyl group, a mesyl group, a nosyl group, an octadecylsilyl group, a pivaloyl group, a methoxybenzyl group, a methoxyphenyl group, a propyl group, an ethoxymethyl group, a trimethylsilyl group, a trimethylsilylethoxymethyl group, a siamyl group, a tert-butyl group, a tert-butyldimethylsilyl group, a tert-butyldiphenylsilyl group, a tert-butyldimethylsilyl group, a triethylsilyl group, a tetrahydropyranyl group, a triisopropylsilyl group, a trimethylsilyl group, a tolyl group, a tosyl group, a triisopropylbenzenesulfonyl group, a trityl group, a trichloroethoxycarbonyl group, a benzyloxycarbonyl group, a methylene group, a valeryl group, a methoxy group, an acetamide group, a trimethylammonium group, a diazo group, a hydrocarbon group, or the like, but are not limited thereto. R1, R2, and R3 may be each a substituent group having any of these substances in the structure. R1, R2, and R3 may be each fluorine, bromine, chlorine, iodine, or the like, or may be each a substituent group having any of these substances in the structure. R1, R2, and R3 may be each an ionized substituent group, such as a cation or anion, that forms an ionic liquid structure, or may be each a substituent group having such a substance in the structure. R1 and R2 may be different substituent groups.

A and Q each independently represent a single bond or linking group. Examples of Q which is a linking group include groups, such as an alkylene group, —O—, —NH2—, and an carbonyl group. Examples of A which is a linking group include groups, such as an alkylene group, —O—, and —C(=O)O—. n is an integer greater than or equal to 2, and m is an integer greater than or equal to 1. If m is an integer equal to or greater than 2, multiple R3 may be the same or different, multiple Q may also be the same or different, and A and Q may be the same or different in the above-mentioned structural formula. The hemicellulose polymer has a molecular weight of (weight average molecular weight Mw) 1,000 to 10,000,000. If a hemicellulose polymer having a molecular weight of 30,000 to 1,000,000 is injection-molded, a molded product having good strength is obtained.

Preparation of Hemicellulose, Hemicellulose Derivative, and Hemicellulose Monomer Fragments obtained by crushing wood into small sizes are called wood chips. When these wood chips are put into an aqueous solution containing butanol and heated, this solution is separated into the butanol/lignin phase and the water/hemicellulose phase. Cellulose precipitates as a solid. By removing water from the water/hemicellulose phase, hemicellulose powder can be obtained. In the structural formula of this hemicellulose powder, R5 and R6 are hydrogen. This hemicellulose powder has high hydrophilicity and therefore easily captures moisture. A molded product including this hemicellulose powder having high water absorbency is more likely to change in size, volume, or weight with time, as well as may decrease in strength, transparency, or heat resistance.

For this reason, a hemicellulose derivative is prepared by changing R5 and R6 in the structural formula of the hemicellulose powder from hydrogen to acetyl groups so that an acetylation reaction occurs in the hemicellulose powder. A hemicellulose derivative may be prepared by changing R5 and R6 in the structural formula of the hemicellulose powder from hydrogen to substituent groups, such as acetonyl groups, propenyl groups, or carboxyl groups, rather than acetyl groups so that a corresponding chemical reaction occurs in the hemicellulose powder. The preparation of such a hemicellulose derivative was performed using a conventional sugar derivative preparation technology. This sugar derivative preparation technology is a technology proposed by Yamagata University, Nippon Kayaku Co., Ltd., HORIBA STEC, Co., Ltd., Kobe Natural Products Chemical Co., Ltd., or Hayashibara Co., Ltd.

By applying a methacrylation reaction or acrylation reaction to a hemicellulose or hemicellulose derivative, a hemicellulose methacrylate or hemicellulose acrylate, which is a monomer, is obtained. This monomer has a molecular structure in which a methacrylic group or acryloyl group is bonded to the hemicellulose or hemicellulose derivative. Note that a methacrylate or acrylate need not necessarily be used. This monomer is called "hemicellulose monomer." By polymerizing the hemicellulose monomer, a hemicellulose polymer, which is a resin, is obtained. The hemicellulose polymer can have various resin material properties. A poly(hemicellulose methacrylate) obtained by polymerizing a hemicellulose methacrylate has both the properties of a hemicellulose and those of polymethylmethacrylate (PMMA). That is, the poly(hemicellulose methacrylate) is a plastic having biodegradability, as well as high transparency and good strength. To cause methacrylation or acrylation, there can be used a technology that synthesizes a methacrylate monomer or acrylate monomer, which a raw-material monomer for a conventional ultraviolet curing resin. The hemicellulose monomer of the present embodiment was prepared using a conventional monomer synthesis technology owned by Kobe Natural Products Chemical Co., Ltd., Nippon Kayaku Co., Ltd., or Osaka Organic Chemical Industry Co., Ltd. To polymerize the hemicellulose monomer, there can be used a polymerization technology, such as conventional polymerization, radical polymerization used to obtain a block copolymer or the like, anionic polymerization, living radical polymerization, and living anionic polymerization. The hemicellulose polymer of the present embodiment was prepared using the conventional polymerization technology. Specifically, a polymer source polymerization technology proposed by HORIBA STEC, Arkema Co., Ltd., or Nippon Kayaku Co., Ltd. was used.

As described below, a hemicellulose or hemicellulose derivative is methacrylated into a hemicellulose methacrylate (in the formula below, R represents the hemicellulose or hemicellulose derivative), which is then polymerized to obtain a poly(hemicellulose methacrylate).

[Chemical Formula 6]

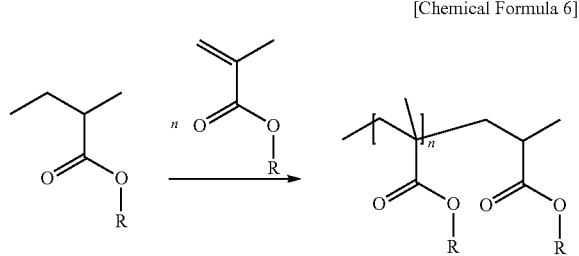

Or, as described below, a hemicellulose or hemicellulose derivative is acrylated into a hemicellulose acrylate (in the formula below, R represents the hemicellulose or hemicellulose derivative), which is then polymerized to obtain a poly(hemicellulose acrylate).

[Chemical Formula 7]

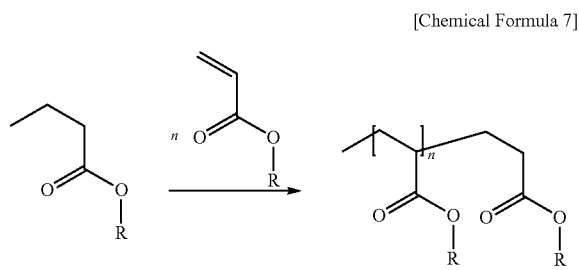

Resin Composition for Molding

While the hemicellulose polymer, which is the first resin, serves as a resin composition or resin pellets for injection molding on its own, it may be mixed with a second resin. In this case, a resin composition for injection molding is obtained by mixing the powdery hemicellulose polymer with powder, pellets, or the like of the second resin and charging the mixture into an extruder/kneader.

The first resin and second resin are melted and kneaded in the extruder/kneader, and the kneaded resin composition is extruded in the form of a tube from the nozzle of the extruder/kneader. The tubular resin is cut into resin pellets made of the resin composition using a pelletizer. The resin pellets are resin pieces having a diameter of 0.2 to 3 mm and a length of 0.2 to 5 mm.

The second resin is polycarbonate (PC), cyclo olefin polymer (COP), cyclo olefin copolymer (COC), polypropylene (PP), polyethylene (PE), polyethylene terephthalate (PET), polystyrene (PS), polylactic acid (PLA), or the like, but is not limited to these resins.

A resin having the following structural formula may be mixed as the second resin. Examples of such a resin include polymethylmethacrylate (PMMA, acrylic).

[Chemical Formula 2]

(化2)

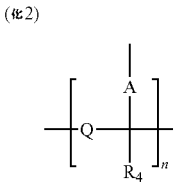

In this formula, R4 represents a substituent group similar to the substituent group represented by R1, R2, or R3.

A and Q each independently represent a single bond or linking group and are similar to the above-mentioned A and Q.

n is an integer greater than or equal to 2.

The second resin has a molecular weight of (weight average molecular weight Mw) 1,000 to 10,000,000. If the second resin having a molecular weight of 30,000 to 1,000,000 is injection-molded, a molded product having good strength is obtained.

The resin pellets made of the resin composition including the first and second resins are charged into an injection molding machine, and a molded product having a shape corresponding to a mold is obtained. When the molded product made of the resin composition of the present embodiment enters soil or seawater, the first resin, which is mixed with the second resin in the resin composition at a molecular level, is biodegraded by microorganisms and thus the second resin is also biodegraded at a molecular level. In this way, biodegradation proceeds. In other words, the first resin performs a function of providing the second resin with biodegradability, which had never been predicted until this invention even by the present inventors. This is a finding that those skilled in the art involved in plastics, bioplastics, or biodegradable plastics cannot easily conceive of. And this is a finding that the experiments in Examples of the present invention demonstrated. The present inventors believe that when the molecules of the first resin are inserted between the molecules of the second resin, biodegradation of the first resin facilitates biodegradation of the molecules of the second resin.

The present inventors also found that the resin composition including the first and second resins mixed at a molecular level has higher heat resistance, strength, fluidity, transcription properties, and optical properties than the resin composition including the first resin alone, which the present inventors had never predicted until this invention. This is a finding that those skilled in the art involved in plastics, bioplastics, or biodegradable plastics cannot easily conceive of. And this is a finding that the experiments in Examples of the present invention demonstrated. The present inventors believe that the resin composition became a material that is stable at high temperatures, stronger, and optically uniform, due to the complicated intertwining between the molecules of the first resin and the molecules of the second resin and thus improved in total light transmittance and birefringence. The present inventors also believe that the second resin functioned as a solvent when the first resin melted and thus the resin composition decreased in viscosity and improved in fluidity and transcription properties.

Molded Product by Light Molding

First Embodiment

A poly(hemicellulose methacrylate) was used as the hemicellulose polymer. The molecular structure of the poly(hemicellulose methacrylate) is as follows.

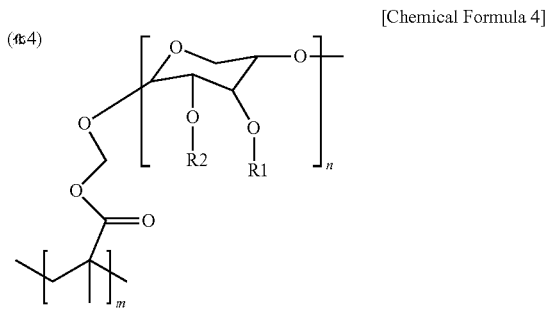

[Chemical Formula 4]

CH3 (methyl group), a methylene group, and —C(=O)O— in Chemical Formula 4 correspond to R3, Q, and A, respectively, in Chemical Formula 1, which is a structural formula. n is an integer greater than or equal to 1.

In a first embodiment, resin pellets (Example 10) were made of a resin composition including, as the first resin, 100 percent by weight of a poly(hemicellulose methacrylate) made of a hemicellulose derivative including acetyl groups as R1 and R2 in Chemical Formula 4, which is a structural formula. Similarly, resin pellets (Example 60) were made of a resin composition including, as the first resin, 100 percent by weight of a poly(hemicellulose methacrylate) made of a hemicellulose derivative including acetonyl groups as R1 and R2, and resin pellets (Example 110) were made of a resin composition including, as the first resin, 100 percent by weight of a poly(hemicellulose methacrylate) made of a hemicellulose derivative including carboxyl groups as R1 and R2. These poly(hemicellulose methacrylates) have Chemical Formula 4, which is a structural formula. These poly(hemicellulose methacrylates) had a molecular weight (weight average molecular weight Mw) of 100,000. Samples of a dumbbell piece, a strip piece, a disk substrate, a cup, and a flat plate were produced from these resin pellets by light molding. As a comparative example, samples of a dumbbell piece, a strip piece, a disk substrate, a cup, and a flat plate were produced from resin pellets made of a resin composition including 100 percent by weight of PLA (polylactic acid) (having a molecular weight (weight average molecular weight Mw) of 100,000). These samples were evaluated for heat-resistant temperature, tensile strength, bending strength, fluidity, transcription properties, total light transmittance, birefringence phase difference, impurity concentration, and biodegradation rate. The evaluation results are shown in Table 1.

TABLE 1

| EVALUATION ITEM | TARGET VALUE | POLY(HEMICELLULOSE METHACRYLATES) | | | COMPARATIVE EXAMPLE PLA100% | MEASUREMENT METHOD |
|---|---|---|---|---|---|---|
| | | ACETYL GROUP | ACETONYL GROUP | CARBOXYL GROUP | | |
| HEAT-RESISTANT TEMPERATURE | 120° C. OR MORE | 185 | 186 | 185 | 58 | ISO75 |
| TENSILE STRENGTH | 80 OR MORE | 90 | 89 | 90 | 63 | ISO527 |
| BENDING STRENGTH | 150 OR MORE | 160 | 165 | 160 | 106 | ISO178 |
| FLUIDITY | 15 OR MORE | 19 | 19 | 19 | 3.0 | ISO1133 JIS K 7210 |
| TRANSCRIPTION PROPERTIES | 100 nm OR LESS | 65 | 60 | 65 | 500,000 nm | SEM |
| TOTAL LIGHT TRANSMITTANCE | 92% OR MORE | 93 | 93 | 93 | 90 | ISO13468 |
| BIREFRINGENCE PHASE DIFFERENCE | 30 nm OR LESS | 23 | 23 | 23 | 100 | Dr. Shenck |
| IMPURITY CONCENTRATION | 200 ppb OR LESS | 20 ppb | 20 ppb | 20 ppb | 100 ppm | ELEMENTAL ANALYSIS |
| BIODEGRATION RATE | 90% OR MORE | 98 | 98 | 98 | 0% | ISO19679 27° C. SEAWATER 120 DAYS |

The samples including 100 percent by weight of the poly(hemicellulose methacrylates) exceeded the target values of heat-resistant temperature, tensile strength, bending strength, fluidity, transcription properties, total light transmittance, birefringence phase difference, impurity concentration, and biodegradation rate. Also, the samples including 100 percent by weight of the poly(hemicellulose methacrylates) were better in all the evaluation items than the samples including 100 percent by weight of PLA (polylactic acid). There were not large differences between the poly(hemicellulose methacrylate) including acetyl groups, the poly(hemicellulose methacrylate) including acetonyl groups, and the poly(hemicellulose methacrylate) including carboxyl groups.

To make comparisons with Example 10, Example 60, and Example 110 of fifth to tenth embodiments (to be discussed later), the molded products produced from the poly(hemicellulose methacrylate) including acetyl groups by light molding are referred to as Example 10, the molded products produced from the poly(hemicellulose methacrylate) including acetonyl groups by light molding as Example 60, and the molded products produced from the poly(hemicellulose methacrylate) including carboxyl groups by light molding as Example 110.

Second Embodiment Acetyl Groups

PMMA

Next, each of resin compositions including, at different ratios, a poly(hemicellulose methacrylate) including acetyl groups, which is a hemicellulose polymer, and PMMA was melted and kneaded in the extruder/kneader, and 3 kg of resin pellets was made of the kneaded resin composition. PMMA had a molecular weight (weight average molecular weight Mw) of 120,000.

In Example 1, resin pellets were made of a resin composition including 10 percent by weight of the poly(hemicellulose methacrylate) and 90 percent by weight of PMMA.

In Example 2, resin pellets were made of a resin composition including 20 percent by weight of the poly(hemicellulose methacrylate) and 80 percent by weight of PMMA.

In Example 3, resin pellets were made of a resin composition including 30 percent by weight of the poly(hemicellulose methacrylate) and 70 percent by weight of PMMA.

In Example 4, resin pellets were made of a resin composition including 40 percent by weight of the poly(hemicellulose methacrylate) and 60 percent by weight of PMMA.

In Example 5, resin pellets were made of a resin composition including 50 percent by weight of the poly(hemicellulose methacrylate) and 50 percent by weight of PMMA.

In Example 6, resin pellets were made of a resin composition including 60 percent by weight of the poly(hemicellulose methacrylate) and 40 percent by weight of PMMA.

In Example 7, resin pellets were made of a resin composition including 70 percent by weight of the poly(hemicellulose methacrylate) and 30 percent by weight of PMMA.

In Example 8, resin pellets were made of a resin composition including 80 percent by weight of the poly(hemicellulose methacrylate) and 20 percent by weight of PMMA.

In Example 9, resin pellets were made of a resin composition including 90 percent by weight of the poly(hemicellulose methacrylate) and 10 percent by weight of PMMA.

Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 2A. Note that although the measurement methods are not described in Table 2A, those are the same as the measurement methods in Table 1. The same applies to Tables 2B to 4E below.

TABLE 2A

| EVALUATION ITEM | TARGET VALUE | SECOND A EMBODIMENT (ACETYL GROUP) | | | | | | | | |
|---|---|---|---|---|---|---|---|---|---|---|
| | | 1 | 2 | 3 | 4 | 5 | 6 | 7 | 8 | 9 |
| POLY(HEMICELLULOSE METHACRYLATE) | — | 10 | 20 | 30 | 40 | 50 | 60 | 70 | 80 | 90 |
| PMMA | — | 90 | 80 | 70 | 60 | 50 | 40 | 30 | 20 | 10 |
| HEAT-RESISTANT TEMPERATURE | 120° C. OR MORE | 190 | 195 | 201 | 250 | 250 | 210 | 200 | 205 | 205 |
| TENSILE STRENGTH | 80 OR MORE | 99 | 98 | 95 | 98 | 98 | 99 | 100 | 103 | 99 |
| BENDING STRENGTH | 150 OR MORE | 170 | 170 | 168 | 180 | 180 | 175 | 180 | 178 | 170 |
| FLUIDITY | 15 OR MORE | 20 | 20 | 20 | 25 | 25 | 21 | 22 | 23 | 20 |
| TRANSCRIPTION PROPERTIES | 100 nm OR LESS | 50 | 50 | 45 | 40 | 40 | 40 | 35 | 40 | 50 |
| TOTAL LIGHT TRANSMITTANCE | 92% OR MORE | 95 | 95 | 95 | 96 | 96 | 95 | 95 | 95 | 95 |
| BIREFRINGENCE PHASE DIFFERENCE | 30 nm OR LESS | 20 | 20 | 20 | 10 | 10 | 10 | 20 | 20 | 20 |
| IMPURITY CONCENTRATION | 200 ppb OR LESS | 20 ppb | 20 ppb | 20 ppb | 20 ppb | 10 ppb | 20 ppb | 20 ppb | 10 ppb | 20 ppb |
| BIODEGRADATION RATE | 98% OR MORE | 95 | 95 | 95 | 100 | 100 | 100 | 100 | 100 | 100 |

The samples including PMMA as the second resin exceeded the target values of heat-resistant temperature, tensile strength, bending strength, fluidity, transcription properties, total light transmittance, birefringence phase difference, impurity concentration, and biodegradation rate, regardless the ratio of PMMA. Although the resin compositions included PMMA at different ratios from 10 percent by weight to 90 percent by weight (and included 90% to 10 percent by weight of the hemicellulose polymer), the respective resin compositions showed good results. For example, the resin compositions including 60% and 50 percent by weight of PMMA were good in heat-resistant temperature, and the resin compositions including 40% to 10 percent by weight of PMMA were good in tensile strength.

Similarly, each of resin compositions including, at different ratios, a poly(hemicellulose methacrylate) including acetyl groups, which is a hemicellulose polymer, and PC, PE, PP, or PET was melted and kneaded in the extruder/kneader, and 3 kg of resin pellets was made of the kneaded resin composition. PC had a molecular weight (weight average molecular weight Mw) of 140,000, PE had a molecular weight of 160,000, PP had a molecular weight of 200,000, and PET had a molecular weight of 300,000.

PC

The resin compositions of Examples 11 to 19 included PC at different ratios from 90 percent by weight to 10 percent by weight (and included 10% to 90 percent by weight of the poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 2B.

TABLE 2B

| EVALUATION ITEM | TARGET VALUE | SECOND B EMBODIMENT (ACETYL GROUP) | | | | | | | | |
|---|---|---|---|---|---|---|---|---|---|---|
| | | 11 | 12 | 13 | 14 | 15 | 16 | 17 | 18 | 19 |
| POLY(HEMICELLULOSE METHACRYLATE) | — | 10 | 20 | 30 | 40 | 50 | 60 | 70 | 80 | 90 |
| PC | — | 90 | 80 | 70 | 60 | 50 | 40 | 30 | 20 | 10 |
| HEAT-RESISTANT TEMPERATURE | 120° C. OR MORE | 191 | 193 | 210 | 260 | 260 | 240 | 230 | 220 | 200 |
| TENSILE STRENGTH | 80 OR MORE | 95 | 95 | 95 | 99 | 99 | 98 | 98 | 96 | 95 |
| BENDING STRENGTH | 150 OR MORE | 155 | 156 | 158 | 170 | 170 | 165 | 164 | 165 | 162 |
| FLUIDITY | 15 OR MORE | 21 | 21 | 22 | 24 | 24 | 22 | 23 | 20 | 20 |
| TRANSCRIPTION PROPERTIES | 100 nm OR LESS | 85 | 50 | 50 | 40 | 40 | 45 | 45 | 50 | 50 |
| TOTAL LIGHT TRANSMITTANCE | 92% OR MORE | 94 | 94 | 94 | 95 | 95 | 94 | 94 | 94 | 94 |
| BIREFRINGENCE PHASE DIFFERENCE | 30 nm OR LESS | 20 | 20 | 20 | 20 | 20 | 21 | 22 | 22 | 22 |
| IMPURITY CONCENTRATION | 200 ppb OR LESS | 20 ppb | 20 ppb | 20 ppb | 20 ppb | 20 ppb | 10 ppb | 10 ppb | 10 ppb | 10 ppb |
| BIODEGRADATION RATE | 98% OR MORE | 95 | 95 | 95 | 100 | 100 | 98 | 98 | 98 | 99 |

The samples including PC as the second resin exceeded the target values of heat-resistant temperature, tensile strength, bending strength, fluidity, transcription properties, total light transmittance, birefringence phase difference, impurity concentration, and biodegradation rate, regardless the ratio of PC. In particular, the resin compositions including 60% to 30 percent by weight of PC (and 40% to 70 percent by weight of the hemicellulose polymer) were good in heat-resistant temperature, tensile strength, bending strength, and the like. The resin compositions including 10% to 90 percent by weight of PC showed better results in almost all the evaluation items than the resin composition including 100 percent by weight of the poly(hemicellulose methacrylate) (Example 10).

PE

The resin compositions of Examples 21 to 29 included PE at different ratios from 90 percent by weight to 10 percent by weight (and included 10% to 90 percent by weight of the poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 2C.

TABLE 2C

| EVALUATION ITEM | TARGET VALUE | SECOND C EMBODIMENT (ACETYL GROUP) | | | | | | | | |
|---|---|---|---|---|---|---|---|---|---|---|
| | | 21 | 22 | 23 | 24 | 25 | 26 | 27 | 28 | 29 |
| POLY(HEMICELLULOSE METHACRYLATE) | — | 10 | 20 | 30 | 40 | 50 | 60 | 70 | 80 | 90 |
| PE | — | 90 | 80 | 70 | 60 | 50 | 40 | 30 | 20 | 10 |
| HEAT-RESISTANT TEMPERATURE | 120° C. OR MORE | 130 | 132 | 145 | 150 | 150 | 145 | 145 | 150 | 160 |
| TENSILE STRENGTH | 80 OR MORE | 95 | 95 | 95 | 100 | 100 | 100 | 104 | 97 | 95 |
| BENDING STRENGTH | 150 OR MORE | 170 | 170 | 173 | 165 | 168 | 170 | 165 | 165 | 165 |
| FLUIDITY | 15 OR MORE | 20 | 21 | 20 | 26 | 26 | 25 | 26 | 22 | 23 |
| TRANSCRIPTION PROPERTIES | 100 nm OR LESS | 90 | 90 | 90 | 70 | 60 | 60 | 50 | 60 | 60 |
| TOTAL LIGHT TRANSMITTANCE | 92% OR MORE | 5 | 7 | 20 | 50 | 60 | 70 | 75 | 80 | 90 |
| BIREFRINGENCE PHASE DIFFERENCE | 30 nm OR LESS | — | — | — | — | — | — | — | 1000 | 1000 |
| IMPURITY CONCENTRATION | 200 ppb OR LESS | 60 ppb | 60 ppb | 60 ppb | 80 ppb | 80 ppb | 80 ppb | 80 ppb | 50 ppb | 30 ppb |
| BIODEGRADATION RATE | 98% OR MORE | 95 | 96 | 98 | 100 | 100 | 100 | 100 | 100 | 99 |

The samples including PE as the second resin were poor in total light transmittance and birefringence phase difference and therefore cannot be applied to optical components, or molded products that are required to be transparent. However, these samples exceeded the target values of the other evaluation items, that is, heat-resistant temperature, tensile strength, bending strength, fluidity, transcription properties, impurity concentration, and biodegradation rate. Although the resin compositions included PE at different ratios from 10 percent by weight to 90 percent by weight (and included 90% to 10 percent by weight of the hemicellulose polymer), the respective resin compositions showed good results and also showed better results in many evaluation items than the samples including 100 percent by weight of the poly(hemicellulose methacrylate).

PP

The resin compositions of Examples 31 to 39 included PP at different ratios from 90 percent by weight to 10 percent by weight (and included 10% to 90 percent by weight of the poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 2D.

TABLE 2D

| EVALUATION ITEM | TARGET VALUE | SECOND D EMBODIMENT (ACETYL GROUP) | | | | | | | | |
|---|---|---|---|---|---|---|---|---|---|---|
| | | 31 | 32 | 33 | 34 | 35 | 36 | 37 | 38 | 39 |
| POLY(HEMICELLULOSE METHACRYLATE) | — | 10 | 20 | 30 | 40 | 50 | 60 | 70 | 80 | 90 |
| PP | — | 90 | 80 | 70 | 60 | 50 | 40 | 30 | 20 | 10 |
| HEAT-RESISTANT TEMPERATURE | 120° C. OR MORE | 200 | 210 | 210 | 250 | 250 | 230 | 240 | 220 | 210 |
| TENSILE STRENGTH | 80 OR MORE | 93 | 93 | 95 | 94 | 94 | 92 | 93 | 93 | 94 |
| BENDING STRENGTH | 150 OR MORE | 165 | 165 | 164 | 165 | 165 | 164 | 163 | 163 | 163 |
| FLUIDITY | 15 OR MORE | 21 | 21 | 22 | 25 | 25 | 22 | 23 | 23 | 21 |
| TRANSCRIPTION PROPERTIES | 100 nm OR LESS | 90 | 90 | 92 | 90 | 90 | 93 | 90 | 85 | 80 |
| TOTAL LIGHT TRANSMITTANCE | 92% OR MORE | 5 | 5 | 20 | 40 | 50 | 60 | 65 | 70 | 75 |
| BIREFRINGENCE PHASE DIFFERENCE | 30 nm OR LESS | — | — | — | — | — | — | — | — | — |
| IMPURITY CONCENTRATION | 200 ppb OR LESS | 90 ppb | 90 ppb | 90 ppb | 90 ppb | 90 ppb | 90 ppb | 90 ppb | 80 ppb | 80 ppb |
| BIODEGRADATION RATE | 98% OR MORE | 96 | 98 | 97 | 100 | 100 | 97 | 97 | 97 | 98 |

The samples including PP as the second resin were poor in total light transmittance and birefringence phase difference and therefore cannot be applied to optical components, or molded products that are required to be transparent. However, these samples exceeded the target values of the other evaluation items, that is, heat-resistant temperature, tensile strength, bending strength, fluidity, transcription properties, impurity concentration, and biodegradation rate. Although the resin compositions included PP at different ratios from 10 percent by weight to 90 percent by weight (and included 90% to 10 percent by weight of the hemicellulose polymer), the respective resin compositions showed good results and also showed better results in heat-resistant temperature, tensile strength, bending strength, and fluidity than the resin composition including 100 percent by weight of the poly(hemicellulose methacrylate).

PET

The resin compositions of Examples 41 to 49 included PET at different ratios from 90 percent by weight to 10 percent by weight (and included 10% to 90 percent by weight of poly(hemicellulose methacrylate)). Samples of a dumbbell piece, a strip piece, a disk substrate, a cup, and a flat plate were produced from the nine types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 2E.

almost all the evaluation items than the resin composition including 100 percent by weight of the poly(hemicellulose methacrylate) (Example 10).

Third Embodiment Acetonyl Groups

PMMA

Next, each of resin compositions including, at different ratios, a poly(hemicellulose methacrylate) including acetonyl groups, which is a hemicellulose polymer, and PMMA was melted and kneaded in the extruder/kneader, and 3 kg of resin pellets was made of the kneaded resin composition. PMMA had a molecular weight (weight average molecular weight Mw) of 120,000.

The resin compositions of Examples 51 to 59 included PMMA at different ratios from 90 percent by weight to 10

TABLE 2E

| EVALUATION ITEM | TARGET VALUE | SECOND E EMBODIMENT (ACETYL GROUP) | | | | | | | | |
|---|---|---|---|---|---|---|---|---|---|---|
| | | 41 | 42 | 43 | 44 | 45 | 46 | 47 | 48 | 49 |
| POLY(HEMICELLULOSE METHACRYLATE) | — | 10 | 20 | 30 | 40 | 50 | 60 | 70 | 80 | 90 |
| PET | — | 90 | 80 | 70 | 60 | 50 | 40 | 30 | 20 | 10 |
| HEAT-RESISTANT TEMPERATURE | 120° C. OR MORE | 240 | 240 | 230 | 260 | 260 | 250 | 240 | 220 | 200 |
| TENSILE STRENGTH | 80 OR MORE | 95 | 95 | 95 | 99 | 99 | 98 | 98 | 94 | 94 |
| BENDING STRENGTH | 150 OR MORE | 170 | 170 | 170 | 190 | 190 | 185 | 180 | 170 | 170 |
| FLUIDITY | 15 OR MORE | 22 | 22 | 22 | 26 | 26 | 23 | 23 | 23 | 22 |
| TRANSCRIPTION PROPERTIES | 100 nm OR LESS | 60 | 60 | 50 | 40 | 40 | 40 | 40 | 40 | 50 |
| TOTAL LIGHT TRANSMITTANCE | 92% OR MORE | 94 | 94 | 94 | 95 | 95 | 95 | 95 | 94 | 94 |
| BIREFRINGENCE PHASE DIFFERENCE | 30 nm OR LESS | 25 | 30 | 30 | 20 | 20 | 20 | 20 | 22 | 22 |
| IMPURITY CONCENTRATION | 200 ppb OR LESS | 30 ppb | 30 ppb | 20 ppb | 40 ppb | 20 ppb | 40 ppb | 20 ppb | 20 ppb | 20 ppb |
| BIODEGRADATION RATE | 98% OR MORE | 98 | 100 | 100 | 100 | 100 | 99 | 99 | 99 | 99 |

The samples including PET as the second resin exceeded the target values of heat-resistant temperature, tensile strength, bending strength, fluidity, transcription properties, total light transmittance, birefringence phase difference, impurity concentration, and biodegradation rate, regardless the ratio of PET. In particular, the resin compositions including 60% to 30 percent by weight of PET (and 40% to 70 percent by weight of the hemicellulose polymer) were good in heat-resistant temperature, tensile strength, bending strength, and the like. The resin compositions including 10% to 90 percent by weight of PET showed better results in percent by weight (and included 10% to 90 percent by weight of the poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 3A.

TABLE 3A

| EVALUATION ITEM | TARGET VALUE | THIRD A EMBODIMENT (ACETONYL GROUP) | | | | | | | | |
|---|---|---|---|---|---|---|---|---|---|---|
| | | 51 | 52 | 53 | 54 | 55 | 56 | 57 | 58 | 59 |
| POLY(HEMICELLULOSE METHACRYLATE) | — | 10 | 20 | 30 | 40 | 50 | 60 | 70 | 80 | 90 |
| PMMA | — | 90 | 80 | 70 | 60 | 50 | 40 | 30 | 20 | 10 |
| HEAT-RESISTANT TEMPERATURE | 120° C. OR MORE | 195 | 196 | 202 | 255 | 255 | 215 | 205 | 205 | 205 |
| TENSILE STRENGTH | 80 OR MORE | 99 | 98 | 96 | 99 | 99 | 100 | 99 | 102 | 98 |
| BENDING STRENGTH | 150 OR MORE | 170 | 170 | 175 | 185 | 185 | 175 | 180 | 178 | 170 |
| FLUIDITY | 15 OR MORE | 20 | 20 | 23 | 26 | 27 | 22 | 21 | 21 | 19 |
| TRANSCRIPTION PROPERTIES | 100 nm OR LESS | 50 | 50 | 44 | 39 | 39 | 40 | 38 | 40 | 49 |

TABLE 3A-continued

| EVALUATION ITEM | TARGET VALUE | THIRD A EMBODIMENT (ACETONYL GROUP) | | | | | | | | |
|---|---|---|---|---|---|---|---|---|---|---|
| | | 51 | 52 | 53 | 54 | 55 | 56 | 57 | 58 | 59 |
| TOTAL LIGHT TRANSMITTANCE | 92% OR MORE | 95 | 95 | 95 | 96 | 96 | 95 | 95 | 95 | 95 |
| BIREFRINGENCE PHASE DIFFERENCE | 30 nm OR LESS | 20 | 20 | 10 | 10 | 10 | 10 | 20 | 20 | 20 |
| IMPURITY CONCENTRATION | 200 ppb OR LESS | 20 ppb | 20 ppb | 20 ppb | 20 ppb | 10 ppb | 20 ppb | 20 ppb | 10 ppb | 10 ppb |
| BIODEGRADATION RATE | 98% OR MORE | 95 | 95 | 95 | 100 | 100 | 100 | 100 | 100 | 100 |

The samples including PMMA as the second resin exceeded the target values of heat-resistant temperature, tensile strength, bending strength, fluidity, transcription properties, total light transmittance, birefringence phase difference, impurity concentration, and biodegradation rate, regardless the ratio of PMMA. Although the resin compositions included PMMA at different ratios from 10 percent by weight to 90 percent by weight (and included 90% to 10 percent by weight of the hemicellulose polymer), the respective resin compositions showed good results. For example, the resin compositions including 60% and 50 percent by weight of PMMA were good in heat-resistant temperature, and the resin compositions including 40% to 10 percent by weight of PMMA were good in tensile strength. The resin compositions including 10% to 90 percent by weight of PMMA showed better results in many evaluation items than the resin composition including 100 percent by weight of the poly(hemicellulose methacrylate).

Similarly, each of resin compositions including, at different ratios, the poly(hemicellulose methacrylate) including acetonyl groups, which is a hemicellulose polymer, and PC, PE, PP, or PET was melted and kneaded in the extruder/kneader, and 3 kg of resin pellets was made of the kneaded resin composition. PC had a molecular weight (weight average molecular weight Mw) of 140,000, PE had a molecular weight of 160,000, PP had a molecular weight of 200,000, and PET had a molecular weight of 300,000.

PC

The resin compositions of Examples 61 to 69 included PC at different ratios from 90 percent by weight to 10 percent by weight (and included 10% to 90 percent by weight of the poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 3B.

TABLE 3B

| EVALUATION ITEM | TARGET VALUE | THIRD B EMBODIMENT (ACETONYL GROUP) | | | | | | | | |
|---|---|---|---|---|---|---|---|---|---|---|
| | | 61 | 62 | 63 | 64 | 65 | 66 | 67 | 68 | 69 |
| POLY(HEMICELLULOSE METHACRYLATE) | — | 10 | 20 | 30 | 40 | 50 | 60 | 70 | 80 | 90 |
| PC | — | 90 | 80 | 70 | 60 | 50 | 40 | 30 | 20 | 10 |
| HEAT-RESISTANT TEMPERATURE | 120° C. OR MORE | 190 | 193 | 210 | 260 | 260 | 250 | 230 | 220 | 203 |
| TENSILE STRENGTH | 80 OR MORE | 95 | 95 | 95 | 99 | 99 | 98 | 98 | 96 | 95 |
| BENDING STRENGTH | 150 OR MORE | 155 | 155 | 158 | 170 | 170 | 165 | 164 | 165 | 162 |
| FLUIDITY | 15 OR MORE | 22 | 22 | 24 | 26 | 26 | 23 | 20 | 20 | 20 |
| TRANSCRIPTION PROPERTIES | 100 nm OR LESS | 85 | 50 | 50 | 40 | 40 | 45 | 45 | 50 | 50 |
| TOTAL LIGHT TRANSMITTANCE | 92% OR MORE | 94 | 94 | 94 | 95 | 95 | 94 | 94 | 94 | 94 |
| BIREFRINGENCE PHASE DIFFERENCE | 30 nm OR LESS | 20 | 20 | 20 | 20 | 20 | 21 | 22 | 22 | 22 |
| IMPURITY CONCENTRATION | 200 ppb OR LESS | 20 ppb | 20 ppb | 20 ppb | 20 ppb | 20 ppb | 10 ppb | 10 ppb | 10 ppb | 10 ppb |
| BIODEGRADATION RATE | 98% OR MORE | 95 | 95 | 97 | 100 | 100 | 98 | 98 | 98 | 98 |

The samples including PC as the second resin exceeded the target values of heat-resistant temperature, tensile strength, bending strength, fluidity, transcription properties, total light transmittance, birefringence phase difference, impurity concentration, and biodegradation rate, regardless the ratio of PC. In particular, the resin compositions including 60% to 30 percent by weight of PC (and 40% to 70 percent by weight of the hemicellulose polymer) were good in heat-resistant temperature, tensile strength, bending strength, and the like. The resin compositions including 10% to 90 percent by weight of PC also showed better results in almost all the evaluation items than the resin composition including 100 percent by weight of the poly(hemicellulose methacrylate) (Example 60).

PE

The resin compositions of Examples 71 to 79 included PE at different ratios from 90 percent by weight to 10 percent by weight (and included 10% to 90 percent by weight of the poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 3C.

PP

The resin compositions of Examples 81 to 89 included PP at different ratios from 90 percent by weight to 10 percent by weight (and included 10% to 90 percent by weight of the

TABLE 3C

| EVALUATION ITEM | TARGET VALUE | THIRD C EMBODIMENT (ACETONYL GROUP) | | | | | | | | |
|---|---|---|---|---|---|---|---|---|---|---|
| | | 71 | 72 | 73 | 74 | 75 | 76 | 77 | 78 | 79 |
| POLY(HEMICELLULOSE METHACRYLATE) | — | 10 | 20 | 30 | 40 | 50 | 60 | 70 | 80 | 90 |
| PE | — | 90 | 80 | 70 | 60 | 50 | 40 | 30 | 20 | 10 |
| HEAT-RESISTANT TEMPERATURE | 120° C. OR MORE | 130 | 132 | 145 | 150 | 150 | 145 | 145 | 150 | 160 |
| TENSILE STRENGTH | 80 OR MORE | 95 | 95 | 100 | 100 | 100 | 100 | 96 | 97 | 95 |
| BENDING STRENGTH | 150 OR MORE | 170 | 170 | 173 | 170 | 170 | 170 | 165 | 165 | 165 |
| FLUIDITY | 15 OR MORE | 20 | 21 | 20 | 28 | 28 | 28 | 26 | 22 | 23 |
| TRANSCRIPTION PROPERTIES | 100 nm OR LESS | 90 | 90 | 80 | 70 | 60 | 60 | 50 | 60 | 50 |
| TOTAL LIGHT TRANSMITTANCE | 92% OR MORE | 5 | 7 | 20 | 50 | 60 | 70 | 75 | 80 | 90 |
| BIREFRINGENCE PHASE DIFFERENCE | 30 nm OR LESS | — | — | — | — | — | — | — | 1000 | 1000 |
| IMPURITY CONCENTRATION | 200 ppb OR LESS | 60 ppb | 60 ppb | 60 ppb | 80 ppb | 80 ppb | 80 ppb | 80 ppb | 50 ppb | 30 ppb |
| BIODEGRADATION RATE | 98% OR MORE | 96 | 96 | 99 | 100 | 100 | 100 | 98 | 98 | 98 |

The samples including PE as the second resin were poor in total light transmittance and birefringence phase difference and therefore cannot be applied to optical components, or molded products that are required to be transparent. However, these samples exceeded the target values of heat-resistant temperature, tensile strength, bending strength, fluidity, transcription properties, impurity concentration, and biodegradation rate. Although the resin compositions included PE at different ratios from 10 percent by weight to poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 3D.

TABLE 3D

| EVALUATION ITEM | TARGET VALUE | THIRD D EMBODIMENT (ACETONYL GROUP) | | | | | | | | |
|---|---|---|---|---|---|---|---|---|---|---|
| | | 81 | 82 | 83 | 84 | 85 | 86 | 87 | 88 | 89 |
| POLY(HEMICELLULOSE METHACRYLATE) | — | 10 | 20 | 30 | 40 | 50 | 60 | 70 | 80 | 90 |
| PP | — | 90 | 80 | 70 | 60 | 50 | 40 | 30 | 20 | 10 |
| HEAT-RESISTANT TEMPERATURE | 120° C. OR MORE | 200 | 210 | 210 | 250 | 250 | 230 | 240 | 220 | 210 |
| TENSILE STRENGTH | 80 OR MORE | 93 | 93 | 95 | 94 | 94 | 92 | 93 | 93 | 94 |
| BENDING STRENGTH | 150 OR MORE | 165 | 165 | 164 | 165 | 165 | 164 | 163 | 163 | 163 |
| FLUIDITY | 15 OR MORE | 21 | 21 | 22 | 25 | 25 | 22 | 23 | 23 | 21 |
| TRANSCRIPTION PROPERTIES | 100 nm OR LESS | 90 | 90 | 92 | 90 | 90 | 93 | 90 | 85 | 80 |
| TOTAL LIGHT TRANSMITTANCE | 92% OR MORE | 5 | 5 | 20 | 40 | 50 | 60 | 65 | 70 | 75 |
| BIREFRINGENCE PHASE DIFFERENCE | 30 nm OR LESS | — | — | — | — | — | — | — | — | — |
| IMPURITY CONCENTRATION | 200 ppb OR LESS | 90 ppb | 90 ppb | 90 ppb | 90 ppb | 90 ppb | 90 ppb | 90 ppb | 80 ppb | 80 ppb |
| BIODEGRADATION RATE | 98% OR MORE | 96 | 98 | 97 | 100 | 100 | 97 | 97 | 97 | 98 |

90 percent by weight (and included 90% to 10 percent by weight of the hemicellulose polymer), the respective resin compositions showed good results and also showed better results in many evaluation items than the resin composition including 100 percent by weight of the poly(hemicellulose methacrylate).

The samples including PP as the second resin were poor in total light transmittance and birefringence phase difference and therefore cannot be applied to optical components, or molded products that are required to be transparent. However, these samples exceeded the target values of the other evaluation items, that is, heat-resistant temperature, tensile strength, bending strength, fluidity, transcription properties, impurity concentration, and biodegradation rate. Although the resin compositions included PP at different ratios from 10 percent by weight to 90 percent by weight (and included 90% to 10 percent by weight of the hemicellulose polymer), the respective resin compositions showed good results and also showed better results in heat-resistant temperature, tensile strength, bending strength, and fluidity than the resin composition including 100 percent by weight of the poly(hemicellulose methacrylate).

PET

The resin compositions of Examples 91 to 99 included PET at different ratios from 90 percent by weight to 10 percent by weight (and included 10% to 90 percent by weight of the poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 3E.

good in heat-resistant temperature, tensile strength, bending strength, and the like. The resin compositions including 10% to 90 percent by weight of PET also showed better results in almost all the evaluation items than the resin composition including 100 percent by weight of the poly(hemicellulose methacrylate) (Example 60).

Fourth Embodiment Carboxyl Groups

PMMA

Next, each of resin compositions including, at different ratios, a poly(hemicellulose methacrylate) including carboxyl groups, which is a hemicellulose polymer, and PMMA was melted and kneaded in the extruder/kneader, and 3 kg of resin pellets was made of the kneaded resin composition. PMMA had a molecular weight (weight average molecular weight Mw) of 120,000.

The resin compositions of Examples 101 to 109 included PMMA at different ratios from 90 percent by weight to 10 percent by weight (and included 10% to 90 percent by weight of the poly(hemicellulose methacrylate)). Samples of a dumbbell piece, a strip piece, a disk substrate, a cup, and

TABLE 3E

| EVALUATION ITEM | TARGET VALUE | THIRD E EMBODIMENT (ACETONYL GROUP) | | | | | | | | |
|---|---|---|---|---|---|---|---|---|---|---|
| | | 91 | 92 | 93 | 94 | 95 | 96 | 97 | 98 | 99 |
| POLY(HEMICELLULOSE METHACRYLATE) | — | 10 | 20 | 30 | 40 | 50 | 60 | 70 | 80 | 90 |
| PET | — | 90 | 80 | 70 | 60 | 50 | 40 | 30 | 20 | 10 |
| HEAT-RESISTANT TEMPERATURE | 120° C. OR MORE | 220 | 220 | 250 | 260 | 260 | 250 | 230 | 220 | 200 |
| TENSILE STRENGTH | 80 OR MORE | 95 | 95 | 95 | 99 | 99 | 98 | 98 | 94 | 94 |
| BENDING STRENGTH | 150 OR MORE | 170 | 170 | 170 | 190 | 190 | 185 | 180 | 170 | 170 |
| FLUIDITY | 15 OR MORE | 22 | 22 | 25 | 26 | 26 | 25 | 23 | 23 | 22 |
| TRANSCRIPTION PROPERTIES | 100 nm OR LESS | 60 | 60 | 50 | 40 | 40 | 40 | 40 | 40 | 50 |
| TOTAL LIGHT TRANSMITTANCE | 92% OR MORE | 94 | 94 | 94 | 95 | 95 | 95 | 95 | 94 | 94 |
| BIREFRINGENCE PHASE DIFFERENCE | 30 nm OR LESS | 25 | 30 | 30 | 20 | 20 | 20 | 20 | 22 | 22 |
| IMPURITY CONCENTRATION | 200 ppb OR LESS | 30 ppb | 30 ppb | 20 ppb | 40 ppb | 20 ppb | 40 ppb | 20 ppb | 20 ppb | 20 ppb |
| BIODEGRADATION RATE | 98% OR MORE | 98 | 98 | 100 | 100 | 100 | 100 | 99 | 99 | 99 |

The samples including PET as the second resin exceeded the target values of heat-resistant temperature, tensile strength, bending strength, fluidity, transcription properties, total light transmittance, birefringence phase difference, impurity concentration, and biodegradation rate, regardless the ratio of PET. In particular, the resin compositions including 60% to 30 percent by weight of PET (and 40% to 70 percent by weight of the hemicellulose polymer) were a flat plate were produced from the nine types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 4A.

TABLE 4A

| EVALUATION ITEM | TARGET VALUE | FOURTH A EMBODIMENT (CARBOXYL GROUP) | | | | | | | | |
|---|---|---|---|---|---|---|---|---|---|---|
| | | 101 | 102 | 103 | 104 | 105 | 106 | 107 | 108 | 109 |
| POLY(HEMICELLULOSE METHACRYLATE) | — | 10 | 20 | 30 | 40 | 50 | 60 | 70 | 80 | 90 |
| PMMA | — | 90 | 80 | 70 | 60 | 50 | 40 | 30 | 20 | 10 |
| HEAT-RESISTANT TEMPERATURE | 120° C. OR MORE | 190 | 195 | 208 | 250 | 250 | 210 | 200 | 205 | 205 |
| TENSILE STRENGTH | 80 OR MORE | 99 | 98 | 99 | 100 | 100 | 99 | 98 | 98 | 97 |
| BENDING STRENGTH | 150 OR MORE | 170 | 170 | 168 | 180 | 180 | 175 | 180 | 178 | 170 |

TABLE 4A-continued

| EVALUATION ITEM | TARGET VALUE | FOURTH A EMBODIMENT (CARBOXYL GROUP) | | | | | | | | |
|---|---|---|---|---|---|---|---|---|---|---|
| | | 101 | 102 | 103 | 104 | 105 | 106 | 107 | 108 | 109 |
| FLUIDITY | 15 OR MORE | 20 | 20 | 24 | 25 | 25 | 24 | 22 | 21 | 20 |
| TRANSCRIPTION PROPERTIES | 100 nm OR LESS | 50 | 50 | 45 | 40 | 40 | 40 | 35 | 40 | 50 |
| TOTAL LIGHT TRANSMITTANCE | 92% OR MORE | 95 | 95 | 95 | 96 | 96 | 95 | 95 | 95 | 95 |
| BIREFRINGENCE PHASE DIFFERENCE | 30 nm OR LESS | 20 | 20 | 20 | 10 | 10 | 10 | 20 | 20 | 20 |
| IMPURITY CONCENTRATION | 200 ppb OR LESS | 20 ppb | 20 ppb | 20 ppb | 20 ppb | 10 ppb | 20 ppb | 20 ppb | 10 ppb | 10 ppb |
| BIODEGRADATION RATE | 98% OR MORE | 95 | 95 | 100 | 100 | 100 | 100 | 98 | 98 | 98 |

The samples including PMMA as the second resin exceeded the target values of heat-resistant temperature, tensile strength, bending strength, fluidity, transcription properties, total light transmittance, birefringence phase difference, impurity concentration, and biodegradation rate, regardless the ratio of PMMA. Although the resin compositions included PMMA at different ratios from 10 percent by weight to 90 percent by weight (and included 90% to 10 percent by weight of the hemicellulose polymer), the respective resin compositions showed good results. For example, the resin compositions including 60% and 50 percent by weight of PMMA were good in heat-resistant temperature, and the resin compositions including 40% to 10 percent by weight of PMMA were good in tensile strength. The resin compositions including 10% to 90 percent by weight of PMMA also showed better results in many evaluation items than the resin composition including 100 percent by weight of the poly(hemicellulose methacrylate).

Similarly, each of resin compositions including, at different ratios, the poly(hemicellulose methacrylate) including carboxyl groups, which is a hemicellulose polymer, and PC, PE, PP, or PET was melted and kneaded in the extruder/kneader, and 3 kg of resin pellets was made of the kneaded resin composition. PC had a molecular weight (weight average molecular weight Mw) of 140,000, PE had a molecular weight of 160,000, PP had a molecular weight of 200,000, and PET had a molecular weight of 300,000.

PC

The resin compositions of Examples 111 to 119 included PC at different ratios from 90 percent by weight to 10 percent by weight (and included 10% to 90 percent by weight of the poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 4B.

TABLE 4B

| EVALUATION ITEM | TARGET VALUE | FOURTH B EMBODIMENT (CARBOXYL GROUP) | | | | | | | | |
|---|---|---|---|---|---|---|---|---|---|---|
| | | 111 | 112 | 113 | 114 | 115 | 116 | 117 | 118 | 119 |
| POLY(HEMICELLULOSE METHACRYLATE) | — | 10 | 20 | 30 | 40 | 50 | 60 | 70 | 80 | 90 |
| PC | — | 90 | 80 | 70 | 60 | 50 | 40 | 30 | 20 | 10 |
| HEAT-RESISTANT TEMPERATURE | 120° C. OR MORE | 191 | 193 | 220 | 260 | 260 | 240 | 210 | 210 | 200 |
| TENSILE STRENGTH | 80 OR MORE | 95 | 95 | 98 | 99 | 99 | 98 | 97 | 96 | 95 |
| BENDING STRENGTH | 150 OR MORE | 155 | 155 | 165 | 170 | 170 | 165 | 160 | 158 | 157 |
| FLUIDITY | 15 OR MORE | 21 | 21 | 22 | 24 | 24 | 22 | 23 | 20 | 20 |
| TRANSCRIPTION PROPERTIES | 100 nm OR LESS | 65 | 50 | 50 | 40 | 40 | 45 | 45 | 50 | 50 |
| TOTAL LIGHT TRANSMITTANCE | 92% OR MORE | 94 | 94 | 94 | 95 | 95 | 94 | 94 | 94 | 94 |
| BIREFRINGENCE PHASE DIFFERENCE | 30 nm OR LESS | 20 | 20 | 20 | 20 | 20 | 21 | 22 | 22 | 22 |
| IMPURITY CONCENTRATION | 200 ppb OR LESS | 20 ppb | 20 ppb | 20 ppb | 20 ppb | 20 ppb | 10 ppb | 10 ppb | 10 ppb | 10 ppb |
| BIODEGRADATION RATE | 98% OR MORE | 95 | 95 | 98 | 100 | 100 | 98 | 96 | 96 | 96 |

The samples including PC as the second resin exceeded the target values of heat-resistant temperature, tensile strength, bending strength, fluidity, transcription properties, total light transmittance, birefringence phase difference, impurity concentration, and biodegradation rate, regardless the ratio of PC. In particular, the resin compositions including 60% to 30 percent by weight of PC (and 40% to 70 percent by weight of the hemicellulose polymer) were good in heat-resistant temperature, tensile strength, bending strength, and the like. The resin compositions including 10% to 90 percent by weight of PC also showed better results in almost all the evaluation items than the resin composition including 100 percent by weight of the poly(hemicellulose methacrylate) (Example 110).

PE

The resin compositions of Examples 121 to 129 included PE at different ratios from 90 percent by weight to 10 percent by weight (and included 10% to 90 percent by weight of the poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 4C.

Although the resin compositions included PE at different ratios from 10 percent by weight to 90 percent by weight (and included 90% to 10 percent by weight of the hemicellulose polymer), the respective resin compositions showed good results and also showed better results in many evaluation items than the resin composition including 100 percent by weight of the poly(hemicellulose methacrylate)).

PP

The resin compositions of Examples 131 to 139 included PP at different ratios from 90 percent by weight to 10 percent by weight (and included 10% to 90 percent by weight of the poly(hemicellulose methacrylate)). Samples of a dumbbell piece, a strip piece, a disk substrate, a cup, and a flat plate

TABLE 4C

| EVALUATION ITEM | TARGET VALUE | FOURTH C EMBODIMENT (CARBOXYL GROUP) | | | | | | | | |
|---|---|---|---|---|---|---|---|---|---|---|
| | | 121 | 122 | 123 | 124 | 125 | 126 | 127 | 128 | 129 |
| POLY(HEMICELLULOSE METHACRYLATE) | — | 10 | 20 | 30 | 40 | 50 | 60 | 70 | 80 | 90 |
| PE | — | 90 | 80 | 70 | 60 | 50 | 40 | 30 | 20 | 10 |
| HEAT-RESISTANT TEMPERATURE | 120° C. OR MORE | 130 | 132 | 145 | 150 | 150 | 150 | 140 | 140 | 150 |
| TENSILE STRENGTH | 80 OR MORE | 95 | 95 | 95 | 100 | 100 | 100 | 104 | 97 | 95 |
| BENDING STRENGTH | 150 OR MORE | 170 | 170 | 173 | 165 | 168 | 170 | 165 | 165 | 165 |
| FLUIDITY | 15 OR MORE | 20 | 21 | 26 | 26 | 26 | 26 | 24 | 22 | 23 |
| TRANSCRIPTION PROPERTIES | 100 nm OR LESS | 90 | 90 | 90 | 70 | 60 | 60 | 50 | 60 | 60 |
| TOTAL LIGHT TRANSMITTANCE | 92% OR MORE | 5 | 7 | 20 | 50 | 60 | 70 | 75 | 80 | 90 |
| BIREFRINGENCE PHASE DIFFERENCE | 30 nm OR LESS | — | — | — | — | — | — | — | 1000 | 1000 |
| IMPURITY CONCENTRATION | 200 ppb OR LESS | 60 ppb | 60 ppb | 60 ppb | 80 ppb | 80 ppb | 80 ppb | 80 ppb | 50 ppb | 30 ppb |
| BIODEGRADATION RATE | 98% OR MORE | 96 | 96 | 99 | 100 | 100 | 100 | 97 | 97 | 97 |

The samples including PE as the second resin were poor in total light transmittance and birefringence phase difference and therefore cannot be applied to optical components, or molded products that are required to be transparent. However, these samples exceeded the target values of the other evaluation items, that is, heat-resistant temperature, tensile strength, bending strength, fluidity, transcription properties, impurity concentration, and biodegradation rate.

were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 4D.

TABLE 4D

| EVALUATION ITEM | TARGET VALUE | FOURTH D EMBODIMENT (CARBOXYL GROUP) | | | | | | | | |
|---|---|---|---|---|---|---|---|---|---|---|
| | | 131 | 132 | 133 | 134 | 135 | 136 | 137 | 138 | 139 |
| POLY(HEMICELLULOSE METHACRYLATE) | — | 10 | 20 | 30 | 40 | 50 | 60 | 70 | 80 | 90 |
| PP | — | 90 | 80 | 70 | 60 | 50 | 40 | 30 | 20 | 10 |
| HEAT-RESISTANT TEMPERATURE | 120° C. OR MORE | 200 | 210 | 240 | 260 | 260 | 240 | 220 | 220 | 210 |
| TENSILE STRENGTH | 80 OR MORE | 93 | 93 | 95 | 94 | 94 | 92 | 93 | 93 | 94 |
| BENDING STRENGTH | 150 OR MORE | 165 | 165 | 164 | 165 | 165 | 154 | 163 | 163 | 163 |
| FLUIDITY | 15 OR MORE | 21 | 21 | 22 | 25 | 25 | 22 | 23 | 23 | 21 |
| TRANSCRIPTION PROPERTIES | 100 nm OR LESS | 90 | 90 | 92 | 90 | 90 | 93 | 90 | 85 | 80 |
| TOTAL LIGHT TRANSMITTANCE | 92% OR MORE | 5 | 5 | 20 | 40 | 50 | 60 | 65 | 70 | 75 |
| BIREFRINGENCE PHASE DIFFERENCE | 30 nm OR LESS | — | — | — | — | — | — | — | — | — |
| IMPURITY CONCENTRATION | 200 ppb OR LESS | 90 ppb | 90 ppb | 90 ppb | 90 ppb | 90 ppb | 90 ppb | 90 ppb | 80 ppb | 80 ppb |

TABLE 4D-continued

| EVALUATION ITEM | TARGET VALUE | FOURTH D EMBODIMENT (CARBOXYL GROUP) | | | | | | | | |
|---|---|---|---|---|---|---|---|---|---|---|
| | | 131 | 132 | 133 | 134 | 135 | 136 | 137 | 138 | 139 |
| BIODEGRADATION RATE | 98% OR MORE | 96 | 98 | 99 | 100 | 100 | 99 | 97 | 97 | 97 |

The samples including PP as the second resin were poor in total light transmittance and birefringence phase difference and therefore cannot be applied to optical components, or molded products that are required to be transparent. However, these samples exceeded the target values of the other evaluation items, that is, heat-resistant temperature, tensile strength, bending strength, fluidity, transcription properties, impurity concentration, and biodegradation rate. Although the resin compositions included PP at different ratios from 10 percent by weight to 90 percent by weight (and included 90% to 10 percent by weight of the hemicellulose polymer), the respective resin compositions showed good results and also showed better results in heat-resistant temperature, tensile strength, bending strength, and fluidity than the resin composition including 100 percent by weight of the poly(hemicellulose methacrylate).

PET

The resin compositions of Examples 141 to 149 included PET at different ratios from 90 percent by weight to 10 percent by weight (and included 10% to 90 percent by weight of the poly(hemicellulose methacrylate)). Samples of a dumbbell piece, a strip piece, a disk substrate, a cup, and a flat plate were produced from the 9 types of resin pellets by light molding. These samples were evaluated for heat-resistant temperature, tensile strength, bending strength, fluidity, transcription properties, total light transmittance, birefringence phase difference, impurity concentration, and biodegradation rate. The evaluation results are shown in Table 4E.

70 percent by weight of the hemicellulose polymer) were good in heat-resistant temperature, tensile strength, bending strength, and the like. The resin compositions including 10% to 90 percent by weight of PET also showed better results in almost all the evaluation items than the resin composition including 100 percent by weight of the poly(hemicellulose methacrylate) (Example 110).

In summary, the samples including 100 percent by weight of the hemicellulose polymer including acetyl groups, the samples including 100 percent by weight of the hemicellulose polymer including acetonyl groups, and the samples including 100 percent by weight of the hemicellulose polymer including carboxyl groups showed better results in all the evaluation items than the conventional samples including 100 percent by weight of PLA. Also, the resin compositions including 10 to 90 percent by weight of the first resin, which is a hemicellulose polymer, and 90 to 10 percent by weight of the second resin are understood to have shown good results.

Molded Products by Injection Molding (without Gas)

Fifth to Seventh Embodiments

Injection-molded products were produced from resin pellets made of the resin compositions including the first and second resins described in the first to fourth embodiments (Examples 1 to 149).

Figure 1B:
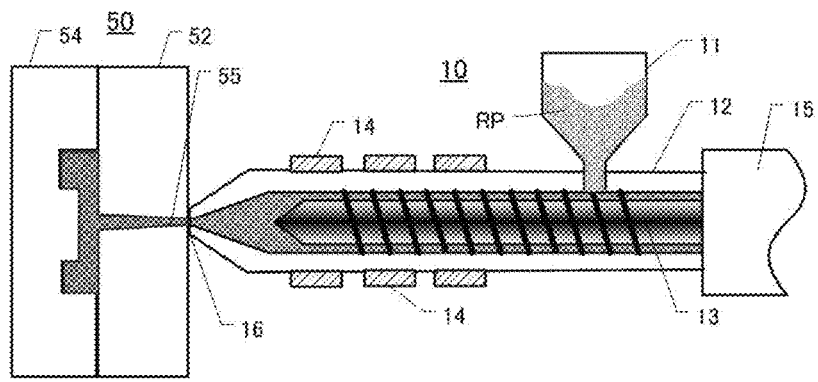
Figure 1C:
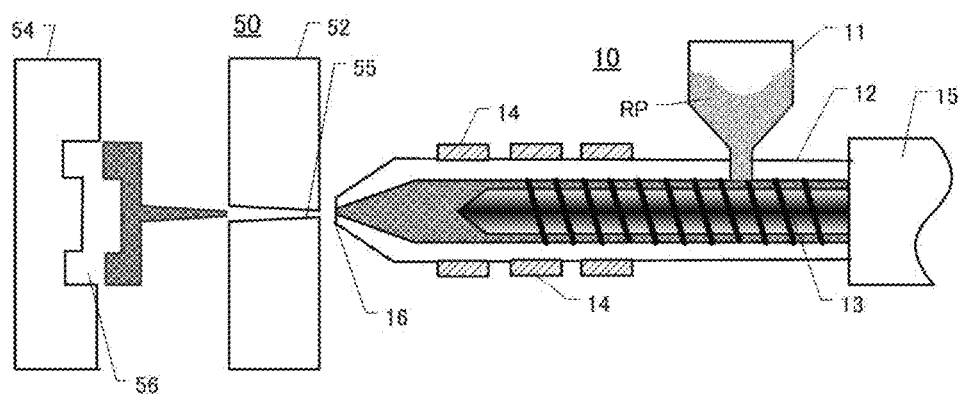

FIGS. 1A to 1C are concept drawings that show production of an injection-molded product using an injection

TABLE 4E

| EVALUATION ITEM | TARGET VALUE | FOURTH E EMBODIMENT (CARBOXYL GROUP) | | | | | | | | |
|---|---|---|---|---|---|---|---|---|---|---|
| | | 141 | 142 | 143 | 144 | 145 | 146 | 147 | 148 | 149 |
| POLY(HEMICELLULOSE METHACRYLATE) | — | 10 | 20 | 30 | 40 | 50 | 60 | 70 | 80 | 90 |
| PET | — | 90 | 80 | 70 | 60 | 50 | 40 | 30 | 20 | 10 |
| HEAT-RESISTANT TEMPERATURE | 120° C. OR MORE | 240 | 240 | 260 | 260 | 260 | 255 | 240 | 220 | 200 |
| TENSILE STRENGTH | 80 OR MORE | 95 | 95 | 95 | 99 | 99 | 98 | 98 | 94 | 94 |
| BENDING STRENGTH | 150 OR MORE | 170 | 170 | 170 | 190 | 190 | 185 | 180 | 170 | 170 |
| FLUIDITY | 15 OR MORE | 22 | 22 | 22 | 26 | 26 | 23 | 23 | 23 | 22 |
| TRANSCRIPTION PROPERTIES | 100 nm OR LESS | 60 | 60 | 50 | 40 | 40 | 40 | 40 | 40 | 50 |
| TOTAL LIGHT TRANSMITTANCE | 92% OR MORE | 94 | 94 | 94 | 95 | 95 | 95 | 95 | 94 | 94 |
| BIREFRINGENCE PHASE DIFFERENCE | 30 nm OR LESS | 25 | 30 | 30 | 20 | 20 | 20 | 20 | 22 | 22 |
| IMPURITY CONCENTRATION | 200 ppb OR LESS | 30 ppb | 30 ppb | 20 ppb | 40 ppb | 20 ppb | 40 ppb | 20 ppb | 20 ppb | 20 ppb |
| BIODEGRADATION RATE | 98% OR MORE | 98 | 98 | 100 | 100 | 100 | 100 | 99 | 99 | 99 |

The samples including PET as the second resin exceeded the target values of heat-resistant temperature, tensile strength, bending strength, fluidity, transcription properties, total light transmittance, birefringence phase difference, impurity concentration, and biodegradation rate, regardless the ratio of PET. In particular, the resin compositions including 60% to 30 percent by weight of PET (and 40% to molding machine 10 and a mold 50, in which FIG. 1A is a drawing that shows a state in which resin pellets RP made of a resin composition are being heated and liquidized in a resin injector; FIG. 1B is a drawing that shows a state in which the liquidized resin composition is being injected from the resin injector into a mold; and FIG. 1C is a drawing that shows a state in which the mold is being opened and a resin molded product is being extracted.

Configuration of Injection Molding Machine

The injection molding machine 10 includes a hopper 11 into which the resin pellets RP made of the resin composition are charged, a cylinder 12 into which the resin pellets RP are charged from the hopper 11, a rotatable screw 13 disposed in the cylinder 12, and heaters 14 disposed outside the cylinder 12. The screw 13 can be moved by a driver 15 in the direction toward the mold and the opposite direction thereof. The liquidized resin composition is injected from an end nozzle 16 of the cylinder 12.

The mold 50 includes a fixed mold 52 and a moving mold 54. When the fixed mold 52 and moving mold 54 closely contact each other, a cavity 56 is formed. The cavity 56 has a spool bush 55, which is a hole into which the liquidized resin composition is put.

Molding Method Using Injection Molding Machine

The resin pellets RP fall from the hopper 11 due to rotation of the screw 13 while being measured. The resin pellets RP are then melted (liquidized) by frictional heat caused by rotation and kneading of and by the screw 13 and the heat of the heaters 14. When the screw 13 is moved by the driver 15 in the direction toward the mold, the measured and liquidized resin composition is injected from the end nozzle 16 of the cylinder 12 into the cavity 56 through the spool bush 55 of the mold 50. The resin composition injected into the cavity 56 is cooled and solidified in the mold 50. Then, when the moving mold 54 is moved and the nozzle 16 of the injection molding machine 10 is released from the spool bush 55, a molded product MD is extracted. At this time, the molded product MD is extracted from the mold 50 due to self-fall or by an extractor (not shown).

As in the first to fourth embodiments, samples of a dumbbell piece, a strip piece, a disk substrate, a cup, and a flat plate were produced from the molded product MD. The evaluation results are shown in Tables 5A (fifth A embodiment) to 7E (seventh E embodiment). Since these samples are molded products, the molding cycle time, molded product defect density, and molded product weight were newly added as evaluation items. On the other hand, the fluidity, birefringence phase difference, and impurity concentration were removed from the evaluation items. Note that with respect to the resin compositions, the first embodiment (Example 10, Example 60, and Example 110) and Examples from Example 1 of the second A embodiment to Example 149 of the fourth E embodiment correspond to Examples from Example 1 of the fifth A embodiment to Example 149 of the seventh E embodiment.

TABLE 5A

| EVALUATION ITEM | TARGET VALUE | FIFTH A EMBODIMENT (ACETYL GROUP) | | | | | | | | | | COMPARATIVE EMBODIMENT | MEASUREMENT METHOD |
|---|---|---|---|---|---|---|---|---|---|---|---|---|---|
| | | 1 | 2 | 3 | 4 | 5 | 6 | 7 | 8 | 9 | 10 | | |
| POLY (HEMICELLULOSE METHACRYLATE) | — | 10 | 20 | 30 | 40 | 50 | 60 | 70 | 80 | 90 | 100 | | |
| PMMA | — | 90 | 80 | 70 | 60 | 50 | 40 | 30 | 20 | 10 | 0 | PLA100% | |
| MOLDING CYCLE TIME | 8(s) OR LESS | 3 | 3 | 3 | 3 | 3 | 3 | 3 | 3 | 3 | 4 | 10 | MOLDING MACHINE |
| MOLDED PRODUCT DEFECT DENSITY | 100 OR LESS | 20 | 20 | 20 | 10 | 10 | 20 | 20 | 25 | 25 | 30 | 354 | KLA |
| MOLDED PRODUCT WEIGHT | 18 g OR LESS | 16 | 16 | 16 | 15 | 15 | 16 | 16 | 16 | 16 | 17 | 19 | WEIGHING DEVICE |
| HEAT-RESISTANT TEMPERATURE | 120° C. OR MORE | 190 | 190 | 201 | 250 | 250 | 240 | 230 | 200 | 200 | 185 | 58 | ISO75 |
| TENSILE STRENGTH | 80 OR MORE | 96 | 96 | 96 | 98 | 98 | 95 | 95 | 95 | 94 | 90 | 63 | ISO527 |
| BENDING STRENGTH | 150 OR MORE | 170 | 170 | 170 | 180 | 180 | 170 | 175 | 165 | 165 | 160 | 106 | ISO178 |
| TRANSCRIPTION PROPERTIES | 100 nm OR LESS | 50 | 50 | 50 | 50 | 50 | 50 | 50 | 60 | 60 | 65 | 500,000 nm | SEM |
| TOTAL LIGHT TRANSMITTANCE | 92% OR MORE | 95 | 95 | 95 | 96 | 96 | 95 | 95 | 95 | 94 | 93 | 90 | ISO13468 |
| BIODEGRADATION RATE | 90% OR MORE | 98 | 98 | 98 | 100 | 100 | 100 | 99 | 99 | 99 | 98 | 0% | ISO19679 |

TABLE 5B

| EVALUATION ITEM | TARGET VALUE | FIFTH B EMBODIMENT (ACETYL GROUP) | | | | | | | | |
|---|---|---|---|---|---|---|---|---|---|
| | | 11 | 12 | 13 | 14 | 15 | 16 | 17 | 18 | 19 |
| POLY (HEMICELLULOSE METHACRYLATE) | — | 10 | 20 | 30 | 40 | 50 | 60 | 70 | 80 | 90 |
| PC | — | 90 | 80 | 70 | 60 | 50 | 40 | 30 | 20 | 10 |
| MOLDING CYCLE TIME | 8(s) OR LESS | 3 | 2 | 3 | 2 | 2 | 2 | 2 | 3 | 3 |
| MOLDED PRODUCT DEFECT DENSITY | 100 OR LESS | 10 | 10 | 10 | 5 | 5 | 7 | 8 | 15 | 20 |
| MOLDED PRODUCT WEIGHT | 18 g OR LESS | 16 | 16 | 16 | 15 | 15 | 15 | 16 | 16 | 16 |
| HEAT-RESISTANT TEMPERATURE | 120° C. OR MORE | 200 | 200 | 210 | 260 | 260 | 240 | 210 | 200 | 195 |

TABLE 5B-continued

| EVALUATION ITEM | TARGET VALUE | FIFTH B EMBODIMENT (ACETYL GROUP) | | | | | | | | |
|---|---|---|---|---|---|---|---|---|---|---|
| | | 11 | 12 | 13 | 14 | 15 | 16 | 17 | 18 | 19 |
| TENSILE STRENGTH | 80 OR MORE | 99 | 99 | 99 | 99 | 99 | 98 | 98 | 97 | 97 |
| BENDING STRENGTH | 150 OR MORE | 165 | 170 | 170 | 170 | 170 | 168 | 168 | 165 | 165 |
| TRANSCRIPTION PROPERTIES | 100 nm OR LESS | 40 | 40 | 40 | 40 | 40 | 45 | 50 | 50 | 50 |
| TOTAL LIGHT TRANSMITTANCE | 92% OR MORE | 95 | 95 | 95 | 95 | 95 | 95 | 94 | 95 | 94 |
| BIODEGRADATION RATE | 90% OR MORE | 98 | 99 | 100 | 100 | 100 | 100 | 100 | 100 | 100 |

TABLE 5C

| EVALUATION ITEM | TARGET VALUE | FIFTH C EMBODIMENT (ACETYL GROUP) | | | | | | | | |
|---|---|---|---|---|---|---|---|---|---|---|
| | | 21 | 22 | 23 | 24 | 25 | 26 | 27 | 28 | 29 |
| POLY (HEMICELLULOSE METHACRYLATE) | — | 10 | 20 | 30 | 40 | 50 | 60 | 70 | 80 | 90 |
| PE | — | 90 | 80 | 70 | 60 | 50 | 40 | 30 | 20 | 10 |
| MOLDING CYCLE TIME | 8(s) OR LESS | 4 | 4 | 4 | 4 | 4 | 4 | 4 | 4 | 4 |
| MOLDED PRODUCT DEFECT DENSITY | 100 OR LESS | 20 | 20 | 10 | 10 | 10 | 10 | 10 | 20 | 20 |
| MOLDED PRODUCT WEIGHT | 18 g OR LESS | 15 | 15 | 15 | 15 | 15 | 16 | 16 | 16 | 16 |
| HEAT-RESISTANT TEMPERATURE | 120° C. OR MORE | 150 | 150 | 150 | 150 | 150 | 150 | 160 | 160 | 170 |
| TENSILE STRENGTH | 80 OR MORE | 92 | 92 | 92 | 95 | 95 | 94 | 92 | 92 | 92 |
| BENDING STRENGTH | 150 OR MORE | 160 | 160 | 160 | 160 | 160 | 162 | 162 | 161 | 162 |
| TRANSCRIPTION PROPERTIES | 100 nm OR LESS | 90 | 90 | 90 | 90 | 90 | 80 | 80 | 70 | 70 |
| TOTAL LIGHT TRANSMITTANCE | 92% OR MORE | 5 | 7 | 20 | 50 | 60 | 70 | 80 | 85 | 90 |
| BIODEGRADATION RATE | 90% OR MORE | 98 | 98 | 98 | 100 | 100 | 100 | 100 | 100 | 100 |

TABLE 5D

| EVALUATION ITEM | TARGET VALUE | FIFTH D EMBODIMENT (ACETYL GROUP) | | | | | | | | |
|---|---|---|---|---|---|---|---|---|---|---|
| | | 31 | 32 | 33 | 34 | 35 | 36 | 37 | 38 | 39 |
| POLY (HEMICELLULOSE METHACRYLATE) | — | 10 | 20 | 30 | 40 | 50 | 60 | 70 | 80 | 90 |
| PP | — | 90 | 80 | 70 | 60 | 50 | 40 | 30 | 20 | 10 |
| MOLDING CYCLE TIME | 8(s) OR LESS | 3 | 3 | 3 | 2 | 2 | 2 | 3 | 3 | 3 |
| MOLDED PRODUCT DEFECT DENSITY | 100 OR LESS | 20 | 20 | 20 | 10 | 10 | 10 | 10 | 20 | 20 |
| MOLDED PRODUCT WEIGHT | 18 g OR LESS | 16 | 16 | 15 | 15 | 15 | 15 | 15 | 16 | 16 |
| HEAT-RESISTANT TEMPERATURE | 120° C. OR MORE | 200 | 200 | 210 | 250 | 250 | 210 | 210 | 200 | 195 |
| TENSILE STRENGTH | 80 OR MORE | 92 | 92 | 93 | 94 | 95 | 95 | 94 | 92 | 92 |
| BENDING STRENGTH | 150 OR MORE | 165 | 165 | 165 | 165 | 165 | 165 | 163 | 163 | 162 |
| TRANSCRIPTION PROPERTIES | 100 nm OR LESS | 90 | 90 | 90 | 90 | 90 | 90 | 90 | 80 | 70 |
| TOTAL LIGHT TRANSMITTANCE | 92% OR MORE | 5 | 5 | 20 | 40 | 50 | 60 | 65 | 70 | 75 |
| BIODFGRADATION RATE | 90% OR MORE | 98 | 98 | 99 | 100 | 100 | 99 | 99 | 100 | 100 |

TABLE 5E

| EVALUATION ITEM | TARGET VALUE | FIFTH E EMBODIMENT (ACETYL GROUP) | | | | | | | | |
|---|---|---|---|---|---|---|---|---|---|---|
| | | 41 | 42 | 43 | 44 | 45 | 46 | 47 | 48 | 49 |
| POLY (HEMICELLULOSE METHACRYLATE) | — | 10 | 20 | 30 | 40 | 50 | 60 | 70 | 80 | 90 |
| PET | — | 90 | 80 | 70 | 60 | 50 | 40 | 30 | 20 | 10 |
| MOLDING CYCLE TIME | 8(s) OR LESS | 3 | 3 | 2 | 2 | 2 | 2 | 2 | 2 | 3 |
| MOLDED PRODUCT DEFECT DENSITY | 200 OR LESS | 15 | 15 | 10 | 10 | 10 | 10 | 10 | 20 | 20 |
| MOLDED PRODUCT WEIGHT | 18 g OR LESS | 16 | 15 | 15 | 15 | 15 | 15 | 16 | 16 | 16 |
| HEAT-RESISTANT TEMPERATURE | 120° C. OR MORE | 190 | 200 | 210 | 260 | 260 | 250 | 230 | 220 | 190 |
| TENSILE STRENGTH | 80 OR MORE | 98 | 98 | 97 | 99 | 99 | 96 | 96 | 95 | 95 |
| BENDING STRENGTH | 150 OR MORE | 170 | 175 | 170 | 190 | 190 | 180 | 170 | 170 | 167 |
| TRANSCRIPTION PROPERTIES | 100 nm OR LESS | 50 | 50 | 50 | 40 | 40 | 50 | 50 | 55 | 55 |
| TOTAL LIGHT TRANSMITTANCE | 92% OR MORE | 95 | 95 | 95 | 95 | 95 | 95 | 95 | 95 | 94 |
| BIODEGRADATION RATE | 90% OR MORE | 98 | 98 | 98 | 100 | 100 | 100 | 99 | 100 | 100 |

TABLE 6A

| EVALUATION ITEM | TARGET VALUE | SIXTH A EMBODIMENT (ACETONYL GROUP) | | | | | | | | | | COMPARATIVE EMBODIMENT | MEASUREMENT METHOD |
|---|---|---|---|---|---|---|---|---|---|---|---|---|---|
| | | 51 | 52 | 53 | 54 | 55 | 56 | 57 | 58 | 59 | 60 | | |
| POLY (HEMICELLULOSE METHACRYLATE) | — | 10 | 20 | 30 | 40 | 50 | 60 | 70 | 80 | 90 | 100 | | |
| PMMA | — | 90 | 80 | 70 | 60 | 50 | 40 | 30 | 20 | 10 | 0 | PLA100% | |
| MOLDING CYCLE TIME | 8(s) OR LESS | 3 | 3 | 2 | 2 | 2 | 2 | 3 | 3 | 3 | 4 | 10 | MOLDING MACHINE |
| MOLDED PRODUCT DEFECT DENSITY | 100 OR LESS | 20 | 20 | 20 | 10 | 10 | 20 | 20 | 25 | 25 | 30 | 354 | KLA |
| MOLDED PRODUCT WEIGHT | 18 g OR LESS | 16 | 16 | 16 | 15 | 15 | 16 | 16 | 16 | 16 | 17 | 19 | WEIGHING DEVICE |
| HEAT-RESISTANT TEMPERATURE | 120° C. OR MORE | 190 | 190 | 220 | 250 | 250 | 240 | 230 | 200 | 200 | 185 | 58 | ISO75 |
| TENSILE STRENGTH | 80 OR MORE | 96 | 96 | 96 | 98 | 98 | 95 | 95 | 95 | 94 | 90 | 63 | ISO527 |
| BENDING STRENGTH | 150 OR MORE | 170 | 170 | 170 | 180 | 180 | 170 | 175 | 165 | 165 | 165 | 106 | ISO178 |
| TRANSCRIPTION PROPERTIES | 100 nm OR LESS | 50 | 50 | 50 | 50 | 50 | 50 | 50 | 60 | 60 | 60 | 500,000 nm | SEM |
| TOTAL LIGHT TRANSMITTANCE | 92% OR MORE | 95 | 95 | 95 | 96 | 96 | 95 | 95 | 95 | 94 | 93 | 90 | ISO13468 |
| BIODEGRADATION RATE | 90% OR MORE | 98 | 98 | 99 | 100 | 100 | 100 | 98 | 98 | 98 | 98 | 0% | ISO19679 |

TABLE 6B

| EVALUATION ITEM | TARGET VALUE | SIXTH B EMBODIMENT (ACETONYL GROUP) | | | | | | | | |
|---|---|---|---|---|---|---|---|---|---|---|
| | | 61 | 62 | 63 | 64 | 65 | 66 | 67 | 68 | 69 |
| POLY (HEMICELLULOSE METHACRYLATE) | — | 10 | 20 | 30 | 40 | 50 | 60 | 70 | 80 | 90 |
| PC | — | 90 | 80 | 70 | 60 | 50 | 40 | 30 | 20 | 10 |
| MOLDING CYCLE TIME | 8(s) OR LESS | 3 | 2 | 3 | 2 | 2 | 2 | 2 | 3 | 3 |
| MOLDED PRODUCT DEFECT DENSITY | 100 OR LESS | 10 | 10 | 10 | 5 | 5 | 7 | 8 | 15 | 20 |
| MOLDED PRODUCT WEIGHT | 18 g OR LESS | 16 | 16 | 15 | 15 | 15 | 15 | 16 | 16 | 16 |

TABLE 6B-continued

| EVALUATION ITEM | TARGET VALUE | SIXTH B EMBODIMENT (ACETONYL GROUP) | | | | | | | | |
|---|---|---|---|---|---|---|---|---|---|---|
| | | 61 | 62 | 63 | 64 | 65 | 66 | 67 | 68 | 69 |
| HEAT-RESISTANT TEMPERATURE | 120° C. OR MORE | 200 | 200 | 210 | 260 | 260 | 240 | 210 | 200 | 195 |
| TENSILE STRENGTH | 80 OR MORE | 99 | 99 | 99 | 99 | 99 | 98 | 98 | 97 | 97 |
| BENDING STRENGTH | 150 OR MORE | 165 | 170 | 170 | 170 | 170 | 168 | 168 | 165 | 165 |
| TRANSCRIPTION PROPERTIES | 100 nm OR LESS | 40 | 40 | 40 | 40 | 40 | 45 | 50 | 50 | 50 |
| TOTAL LIGHT TRANSMITTANCE | 92% OR MODE | 95 | 95 | 95 | 95 | 95 | 95 | 94 | 95 | 94 |
| BIODEGRADATION RATE | 90% OR MORE | 98 | 99 | 100 | 100 | 100 | 100 | 99 | 99 | 98 |

TABLE 6C

| EVALUATION ITEM | TARGET VALUE | SIXTH C EMBODIMENT (ACETONYL GROUP) | | | | | | | | |
|---|---|---|---|---|---|---|---|---|---|---|
| | | 71 | 72 | 73 | 74 | 75 | 76 | 77 | 78 | 79 |
| POLY (HEMICELLULOSE METHACRYLATE) | — | 10 | 20 | 30 | 40 | 50 | 60 | 70 | 80 | 90 |
| PE | — | 90 | 80 | 70 | 60 | 50 | 40 | 30 | 20 | 10 |
| MOLDING CYCLE TIME | 8(s) OR LESS | 4 | 4 | 4 | 4 | 4 | 4 | 4 | 4 | 4 |
| MOLDED PRODUCT DEFECT DENSITY | 100 OR LESS | 20 | 20 | 10 | 10 | 10 | 10 | 10 | 20 | 20 |
| MOLDED PRODUCT WEIGHT | 18 g OR LESS | 15 | 15 | 15 | 15 | 15 | 16 | 16 | 16 | 16 |
| HEAT-RESISTANT TEMPERATURE | 120° C. OR MORE | 150 | 150 | 155 | 155 | 158 | 158 | 160 | 160 | 170 |
| TENSILE STRENGTH | 80 OR MORE | 92 | 92 | 92 | 95 | 95 | 94 | 92 | 92 | 92 |
| BENDING STRENGTH | 150 OR MORE | 160 | 160 | 160 | 160 | 160 | 162 | 162 | 161 | 162 |
| TRANSCRIPTION PROPERTIES | 100 nm OR LESS | 90 | 90 | 90 | 90 | 90 | 80 | 80 | 70 | 70 |
| TOTAL LIGHT TRANSMITTANCE | 92% OR MORE | 5 | 7 | 20 | 50 | 60 | 70 | 80 | 85 | 90 |
| BIODEGRADATION RATE | 90% OR MORE | 98 | 98 | 98 | 100 | 100 | 100 | 100 | 100 | 100 |

TABLE 6D

| EVALUATION ITEM | TARGET VALUE | SIXTH D EMBODIMENT (ACETONYL GROUP) | | | | | | | | |
|---|---|---|---|---|---|---|---|---|---|---|
| | | 81 | 82 | 83 | 84 | 85 | 86 | 87 | 88 | 89 |
| POLY (HEMICELLULOSE METHACRYLATE) | — | 10 | 20 | 30 | 40 | 50 | 60 | 70 | 80 | 90 |
| PP | — | 90 | 80 | 70 | 60 | 50 | 40 | 30 | 20 | 10 |
| MOLDING CYCLE TIME | 8(s) OR LESS | 3 | 3 | 2 | 2 | 2 | 2 | 3 | 3 | 3 |
| MOLDED PRODUCT DEFECT DENSITY | 100 OR LESS | 20 | 20 | 20 | 10 | 10 | 10 | 10 | 20 | 20 |
| MOLDED PRODUCT WEIGHT | 18 g OR LESS | 16 | 16 | 15 | 15 | 15 | 15 | 15 | 16 | 16 |
| HEAT-RESISTANT TEMPERATURE | 120° C. OR MORE | 200 | 200 | 220 | 250 | 250 | 240 | 210 | 200 | 195 |
| TENSILE STRENGTH | 80 OR MORE | 92 | 92 | 93 | 94 | 95 | 95 | 94 | 92 | 92 |
| BENDING STRENGTH | 150 OR MORE | 165 | 165 | 167 | 167 | 167 | 167 | 163 | 163 | 162 |
| TRANSCRIPTION PROPERTIES | 100 nm OR LESS | 90 | 90 | 90 | 90 | 90 | 90 | 90 | 80 | 70 |

TABLE 6D-continued

| EVALUATION ITEM | TARGET VALUE | SIXTH D EMBODIMENT (ACETONYL GROUP) | | | | | | | | |
|---|---|---|---|---|---|---|---|---|---|---|
| | | 81 | 82 | 83 | 84 | 85 | 86 | 87 | 88 | 89 |
| TOTAL LIGHT TRANSMITTANCE | 92% OR MORE | 5 | 5 | 20 | 40 | 50 | 60 | 65 | 70 | 75 |
| BIODEGRADATION RATE | 90% OR MORE | 98 | 98 | 100 | 100 | 100 | 100 | 99 | 100 | 100 |

TABLE 6E

| EVALUATION ITEM | TARGET VALUE | SIXTH E EMBODIMENT (ACETONYL GROUP) | | | | | | | | |
|---|---|---|---|---|---|---|---|---|---|---|
| | | 91 | 92 | 93 | 94 | 95 | 96 | 97 | 98 | 99 |
| POLY (HEMICELLULOSE METHACRYLATE) | — | 10 | 20 | 30 | 40 | 50 | 60 | 70 | 80 | 90 |
| PET | — | 90 | 80 | 70 | 60 | 50 | 40 | 30 | 20 | 10 |
| MOLDING CYCLE TIME | 8(s) OR LESS | 3 | 3 | 2 | 2 | 2 | 2 | 2 | 2 | 3 |
| MOLDED PRODUCT DEFECT DENSITY | 100 OR LESS | 15 | 15 | 10 | 10 | 10 | 10 | 10 | 20 | 20 |
| MOLDED PRODUCT WEIGHT | 18 g OR LESS | 16 | 15 | 15 | 15 | 15 | 15 | 16 | 16 | 16 |
| HEAT-RESISTANT TEMPERATURE | 120° C. OR MORE | 190 | 200 | 240 | 260 | 260 | 250 | 230 | 220 | 190 |
| TENSILE STRENGTH | 80 OR MORE | 98 | 98 | 99 | 99 | 99 | 99 | 96 | 95 | 95 |
| BENDING STRENGTH | 150 OR MORE | 170 | 175 | 170 | 190 | 190 | 180 | 170 | 170 | 167 |
| TRANSCRIPTION PROPERTIES | 100 nm OR LESS | 50 | 50 | 50 | 40 | 40 | 50 | 50 | 55 | 55 |
| TOTAL LIGHT TRANSMITTANCE | 92% OR MORE | 95 | 95 | 95 | 95 | 95 | 95 | 95 | 95 | 94 |
| BIODEGRADATION RATE | 90% OR MORE | 98 | 98 | 100 | 100 | 100 | 100 | 99 | 99 | 99 |

TABLE 7A

| EVALUATION ITEM | TARGET VALUE | SEVENTH A EMBODIMENT (CARBOXYL GROUP) | | | | | | | | | | COMPARATIVE EMBODIMENT | MEASUREMENT METHOD |
|---|---|---|---|---|---|---|---|---|---|---|---|---|---|
| | | 101 | 102 | 103 | 104 | 105 | 106 | 107 | 108 | 109 | 110 | | |
| POLY (HEMICELLULOSE METHACRYLATE) | — | 10 | 20 | 30 | 40 | 50 | 60 | 70 | 80 | 90 | 100 | | |
| PMMA | — | 90 | 80 | 70 | 60 | 50 | 40 | 30 | 20 | 10 | 0 | PLA100% | |
| MOLDING CYCLE TIME | 8(s) OR LESS | 3 | 3 | 3 | 3 | 3 | 3 | 3 | 3 | 3 | 4 | 10 | MOLDING MACHINE |
| MOLDED PRODUCT DEFECT | 100 OR LESS | 20 | 20 | 20 | 10 | 10 | 20 | 20 | 25 | 25 | 30 | 354 | KLA |
| MOLDED PRODUCT WEIGHT | 18 g OR LESS | 16 | 16 | 16 | 15 | 15 | 16 | 16 | 16 | 16 | 17 | 19 | WEIGHING DEVICE |
| HEAT-RESISTANT TEMPERATURE | 120° C. OR MORE | 190 | 190 | 230 | 250 | 250 | 240 | 220 | 200 | 200 | 186 | 58 | ISO75 |
| TENSILE STRENGTH | 80 OR MORE | 96 | 96 | 97 | 98 | 98 | 97 | 95 | 95 | 94 | 91 | 63 | ISO527 |
| BENDING STRENGTH | 150 OR MORE | 170 | 170 | 180 | 185 | 185 | 180 | 175 | 165 | 165 | 160 | 106 | ISO178 |
| TRANSCRIPTION PROPERTIES | 100 nm OR LESS | 50 | 50 | 50 | 50 | 50 | 50 | 50 | 60 | 60 | 60 | 500,000 nm | SEM |
| TOTAL LIGHT TRANSMITTANCE | 92% OR MORE | 95 | 95 | 95 | 96 | 96 | 95 | 95 | 95 | 94 | 93 | 90 | ISO13468 |
| BIODEGRADATION RATE | 90% OR MORE | 98 | 98 | 98 | 100 | 100 | 100 | 99 | 99 | 99 | 99 | 0% | ISO19679 |

TABLE 7B

| EVALUATION ITEM | TARGET VALUE | SEVENTH B EMBODIMENT (CARBOXYL GROUP) | | | | | | | | |
|---|---|---|---|---|---|---|---|---|---|---|
| | | 111 | 112 | 113 | 114 | 115 | 116 | 117 | 118 | 119 |
| POLY (HEMICELLULOSE METHACRYLATE) | — | 10 | 20 | 30 | 40 | 50 | 60 | 70 | 80 | 90 |
| PC | — | 90 | 80 | 70 | 60 | 50 | 40 | 30 | 20 | 10 |
| MOLDING CYCLE TIME | 8(s) OR LESS | 3 | 2 | 3 | 2 | 2 | 2 | 2 | 3 | 3 |
| MOLDED PRODUCT DEFECT DENSITY | 100 OR LESS | 10 | 10 | 7 | 5 | 5 | 7 | 9 | 15 | 20 |
| MOLDED PRODUCT WEIGHT | 18 g OR LESS | 16 | 16 | 15 | 14 | 14 | 15 | 16 | 16 | 16 |
| HEAT-RESISTANT TEMPERATURE | 120° C. OR MORE | 200 | 200 | 210 | 260 | 260 | 240 | 210 | 200 | 195 |
| TENSILE STRENGTH | 80 OR MORE | 99 | 99 | 99 | 99 | 99 | 98 | 98 | 97 | 97 |
| BENDING STRENGTH | 150 OR MORE | 165 | 170 | 170 | 170 | 170 | 168 | 168 | 165 | 165 |
| TRANSCRIPTION PROPERTIES | 100 nm OR LESS | 40 | 40 | 40 | 40 | 40 | 45 | 50 | 50 | 50 |
| TOTAL LIGHT TRANSMITTANCE | 92% OR MORE | 95 | 95 | 95 | 95 | 95 | 95 | 94 | 95 | 94 |
| BIODEGRADATION RATE | 90% OR MORE | 98 | 99 | 100 | 100 | 100 | 100 | 99 | 99 | 99 |

TABLE 7C

| EVALUATION ITEM | TARGET VALUE | SEVENTH C EMBODIMENT (CARBOXYL GROUP) | | | | | | | | |
|---|---|---|---|---|---|---|---|---|---|---|
| | | 121 | 122 | 123 | 124 | 125 | 126 | 127 | 128 | 129 |
| POLY (HEMICELLULOSE METHACRYLATE) | — | 10 | 20 | 30 | 40 | 50 | 60 | 70 | 80 | 90 |
| PE | — | 90 | 80 | 70 | 60 | 50 | 40 | 30 | 20 | 10 |
| MOLDING CYCLE TIME | 8(s) OR LESS | 4 | 4 | 4 | 4 | 4 | 4 | 4 | 4 | 4 |
| MOLDED PRODUCT DEFECT DENSITY | 100 OR LESS | 20 | 20 | 10 | 10 | 10 | 10 | 10 | 20 | 20 |
| MOLDED PRODUCT WEIGHT | 18 g OR LESS | 15 | 15 | 15 | 15 | 15 | 16 | 16 | 16 | 16 |
| HEAT-RESISTANT TEMPERATURE | 120° C. OR MORE | 150 | 150 | 150 | 150 | 150 | 150 | 160 | 160 | 170 |
| TENSILE STRENGTH | 80 OR MORE | 92 | 92 | 97 | 98 | 98 | 97 | 92 | 92 | 92 |
| BENDING STRENGTH | 150 OR MORE | 160 | 160 | 170 | 175 | 175 | 162 | 162 | 161 | 162 |
| TRANSCRIPTION PROPERTIES | 100 nm OR LESS | 90 | 90 | 90 | 90 | 90 | 80 | 80 | 70 | 70 |
| TOTAL LIGHT TRANSMITTANCE | 92% OR MORE | 5 | 7 | 20 | 50 | 60 | 70 | 80 | 85 | 90 |
| BIODEGRADATION RATE | 90% OR MORE | 98 | 98 | 98 | 100 | 100 | 100 | 100 | 100 | 100 |

TABLE 7D

| EVALUATION ITEM | TARGET VALUE | SEVENTH D EMBODIMENT (CARBOXYL GROUP) | | | | | | | | |
|---|---|---|---|---|---|---|---|---|---|---|
| | | 131 | 132 | 133 | 134 | 135 | 136 | 137 | 138 | 139 |
| POLY (HEMICELLULOSE METHACRYLATE) | — | 10 | 20 | 30 | 40 | 50 | 60 | 70 | 80 | 90 |
| PP | — | 90 | 80 | 70 | 60 | 50 | 40 | 30 | 20 | 10 |
| MOLDING CYCLE TIME | 8(s) OR LESS | 3 | 3 | 3 | 2 | 2 | 2 | 3 | 3 | 3 |
| MOLDED PRODUCT DEFECT DENSITY | 100 OR LESS | 20 | 20 | 10 | 10 | 10 | 10 | 15 | 20 | 20 |

TABLE 7D-continued

| EVALUATION ITEM | TARGET VALUE | SEVENTH D EMBODIMENT (CARBOXYL GROUP) | | | | | | | | |
|---|---|---|---|---|---|---|---|---|---|---|
| | | 131 | 132 | 133 | 134 | 135 | 136 | 137 | 138 | 139 |
| MOLDED PRODUCT WEIGHT | 18 g OR LESS | 16 | 16 | 15 | 15 | 15 | 15 | 15 | 16 | 16 |
| HEAT-RESISTANT TEMPERATURE | 120° C. OR MORE | 200 | 200 | 210 | 250 | 250 | 210 | 210 | 200 | 195 |
| TENSILE STRENGTH | 80 OR MORE | 92 | 92 | 93 | 94 | 95 | 95 | 94 | 92 | 92 |
| BENDING STRENGTH | 150 OR MORE | 165 | 165 | 165 | 165 | 165 | 165 | 163 | 163 | 162 |
| TRANSCRIPTION PROPERTIES | 100 nm OR LESS | 90 | 90 | 90 | 90 | 90 | 90 | 90 | 80 | 70 |
| TOTAL LIGHT TRANSMITTANCE | 92% OR MORE | 5 | 5 | 20 | 40 | 50 | 60 | 65 | 70 | 75 |
| BIODEGRADATION RATE | 90% OR MORE | 98 | 98 | 99 | 100 | 100 | 99 | 99 | 100 | 100 |

TABLE 7E

| EVALUATION ITEM | TARGET VALUE | SEVENTH E EMBODIMENT (CARBOXYL GROUP) | | | | | | | | |
|---|---|---|---|---|---|---|---|---|---|---|
| | | 141 | 142 | 143 | 144 | 145 | 146 | 147 | 148 | 149 |
| POLY (HEMICELLULOSE METHACRYLATE) | — | 10 | 20 | 30 | 40 | 50 | 60 | 70 | 80 | 90 |
| PET | — | 90 | 80 | 70 | 60 | 50 | 40 | 30 | 20 | 10 |
| MOLDING CYCLE TIME | 8(s) OR LESS | 3 | 3 | 2 | 2 | 2 | 2 | 2 | 2 | 3 |
| MOLDED PRODUCT DEFECT DENSITY | 100 OR LESS | 15 | 15 | 10 | 10 | 10 | 10 | 10 | 20 | 20 |
| MOLDED PRODUCT WEIGHT | 18 g OR LESS | 16 | 15 | 15 | 15 | 15 | 15 | 16 | 16 | 16 |
| HEAT-RESISTANT TEMPERATURE | 120° C. OR MORE | 190 | 200 | 210 | 260 | 260 | 250 | 230 | 220 | 190 |
| TENSILE STRENGTH | 80 OR MORE | 98 | 98 | 100 | 105 | 105 | 100 | 98 | 95 | 95 |
| BENDING STRENGTH | 150 OR MORE | 170 | 175 | 170 | 190 | 190 | 180 | 170 | 170 | 167 |
| TRANSCRIPTION PROPERTIES | 100 nm OR LESS | 50 | 50 | 50 | 40 | 40 | 50 | 50 | 55 | 55 |
| TOTAL LIGHT TRANSMITTANCE | 92% OR MORE | 95 | 95 | 95 | 95 | 95 | 95 | 95 | 95 | 94 |
| BIODEGRADATION RATE | 90% OR MORE | 98 | 98 | 98 | 100 | 100 | 100 | 99 | 100 | 100 |

As is understood from a comparison between Example 10 of the first embodiment and Example 10 of the fifth A embodiment, the samples produced from 100 percent by weight of the hemicellulose polymer including acetyl groups by light molding and the samples produced from 100 percent by weight of the hemicellulose polymer including acetyl groups by injection molding were approximately the same in heat-resistant temperature, tensile strength, and the like. Also, as is understood from a comparison between Example 60 of the first embodiment and Example 60 of the sixth A embodiment, the samples produced from 100 percent by weight of the hemicellulose polymer including acetonyl groups by light molding and the samples produced from 100 percent by weight of the hemicellulose polymer including acetonyl groups by injection molding were approximately the same in heat-resistant temperature, tensile strength, and the like. Also, as is understood from a comparison between Example 110 of the first embodiment and Example 110 of the seventh A embodiment, the samples produced from 100 percent by weight of the hemicellulose polymer including carboxyl groups by light molding and the samples produced from 100 percent by weight of the hemicellulose polymer including carboxyl groups by injection molding were approximately the same in heat-resistant temperature, tensile strength, and the like.

As shown in the fifth A embodiment, sixth A embodiment, and seventh A embodiment, the resin compositions including the first and second resins showed better results in the injection molding-related evaluation items, that is, the molding cycle time, molded product defect density, and molded product weight than the conventional resin composition including 100 percent by weight of PLA. Also, the resin compositions including 40 to 70 percent by weight of the first resin and 60 to 30 percent by weight of the second resin are understood to have shown good results. The resin compositions including the first resin and second resin have high biodegradability, which solves environmental problems and ocean contamination problems, and injection-molded products can be easily produced from these resin compositions.

Molded Products by Injection Molding (with Gas)

Eighth to Tenth Embodiments

Injection-molded products were produced from resin pellets made of the resin compositions including the first and second resins described in the first to fifth embodiments (Examples 1 to 149). In eighth to tenth embodiments, an inert gas is supplied to at least one of the injection molding machine 10 and mold 50, unlike in the fifth to seventh embodiments.

Figure 2A:
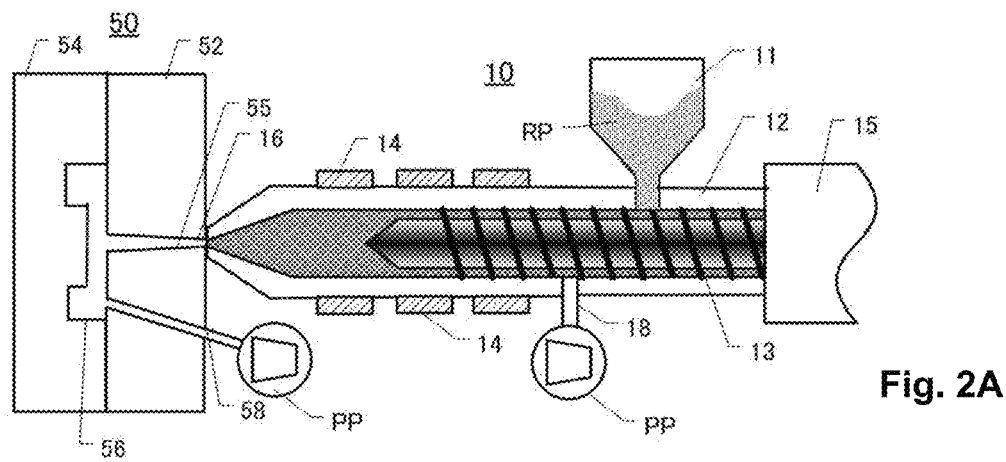
FIGS. 2A to 2C are concept drawings that shows production of an injection-molded product using an injection molding machine and a mold (with a gas).
Figure 2B:
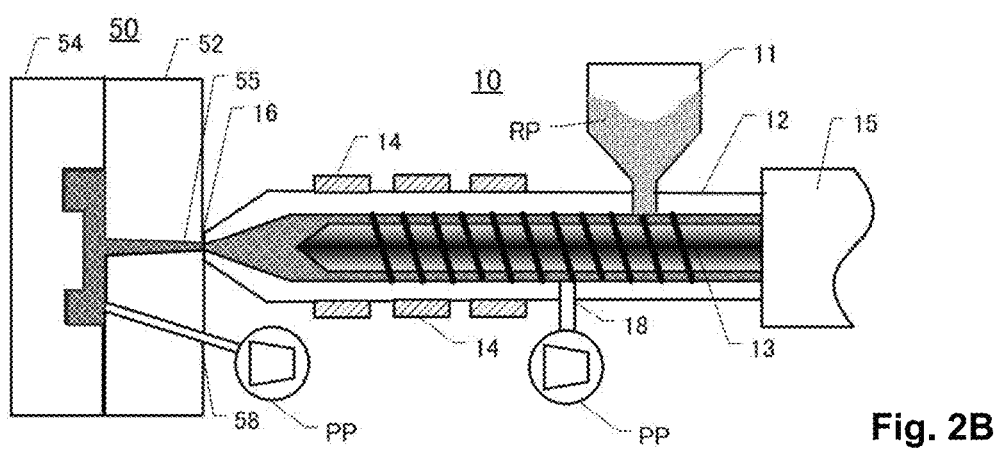
Figure 2C:
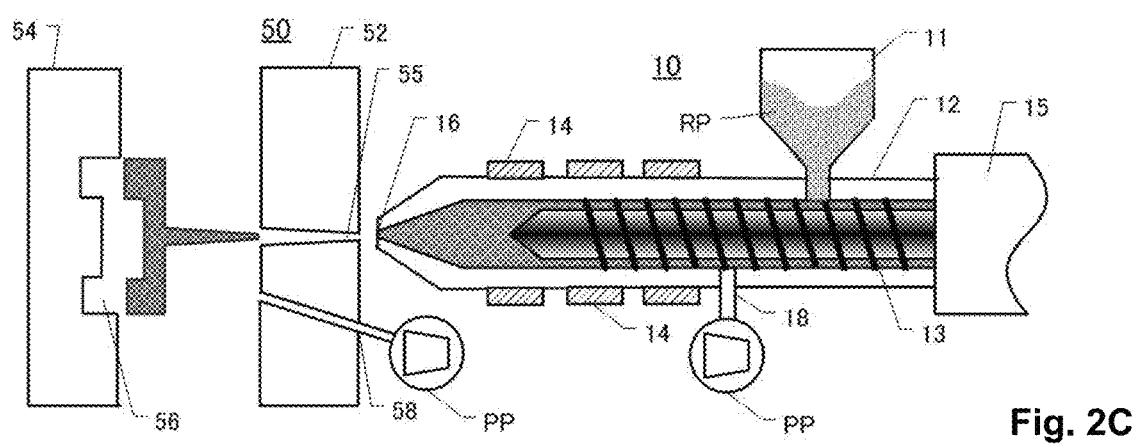

FIGS. 2A to 2C are concept drawings that show production of an injection-molded product using an injection molding machine 10 and a mold 50, in which FIG. 2A is a drawing that shows a state in which resin pellets RP made of a resin composition are being heated and liquidized in a resin injector; FIG. 2B is a drawing that shows a state in which the liquidized resin composition is being injected from the resin injector into a mold; and FIG. 2C is a drawing that shows a state in which the mold is being opened and a resin molded product is being extracted.

Configuration of Injection Molding Machine

The same members as those of the injection molding machine 10 and mold 50 shown in FIGS. 1A to 1C are assigned the same reference signs. The differences between FIGS. 2A to 2C and FIGS. 1A to 1C will be described, and the same reference signs will not be described. A cylinder 12 is provided with a gas supply tube 18 connected to a pump PP. The mold 50 is provided a gas supply tube 58 to which the pump PP is connected. The pump PP supplies an inert gas or the like to the liquidized resin composition. Thus, a formed molded product is obtained. Note that the gas supply tube for supplying an inert gas or the like to the liquidized resin composition only has to be provided on at least one of the injection molding machine 10 and mold 50.

Examples of the foaming gas include inert gases typified by noble gases, such as nitrogen, helium, and argon, carbon dioxide, which is easily dissolved in thermoplastic resins and shows good plasticizer effects, chlorofluorocarbons obtained by substituting fluorine for C1 to C5 saturated hydrocarbon or part thereof, and vapor of liquid, such as water or alcohol. In the present embodiment, carbon dioxide was used as the foaming gas.

Molding Method using Injection Molding Machine

The following molding method is a method in which a gas is supplied to both the liquidized resin composition in the injection molding machine 10 and that in the mold 50. The resin pellets RP fall from the hopper 11 due to rotation of the screw 13 while being measured. The resin pellets RP are then melted (liquidized) by frictional heat caused by rotation and kneading of and by the screw 13 and the heat of the heaters 14. The gas is introduced from the pump PP into the melted resin composition and dispersed in the liquid. When the screw 13 is moved by a driver 15 in the direction toward the mold, the gas-dispersed resin composition is injected from an end nozzle 16 of the cylinder 12 into a cavity 56 through a spool bush 55 of the mold 50.

Subsequently, the gas is introduced from the pump PP into the liquidized resin composition in the cavity 56 and dispersed in the liquid. The gas-containing resin composition is then cooled and solidified in the mold 50. Then, when the moving mold 54 is moved and the nozzle 16 of the injection molding machine 10 is released from the spool bush 55, a molded product MD is extracted. At this time, the molded product MD is extracted from the mold 50 due to self-fall or by an extractor (not shown).

As in the first to fourth embodiments, samples of a dumbbell piece, a strip piece, a disk substrate, a cup, and a flat plate were produced from the molded product MD. The evaluation results are shown in Tables 8A (eighth A embodiment) to 10E (tenth E embodiment). Since these samples are molded products, the molding cycle time, molded product defect density, and molded product weight were newly added as evaluation items. On the other hand, the fluidity, birefringence phase difference, and impurity concentration were removed from the evaluation items. Note that with respect to the resin compositions, the first embodiment (Example 10, Example 60, and Example 110) and Examples from Example 1 of the second A embodiment to Example 149 of the fourth E correspond to Examples from Example 1 of the eighth A embodiment to Example 149 of the tenth E embodiment.

TABLE 8A

| EVALUATION ITEM | TARGET VALUE | \multicolumn{10}{c}{EIGHTH A EMBODIMENT (ACETYL GROUP)} | COMPARATIVE EMBODIMENT | MEASUREMENT METHOD |
|---|---|---|---|---|---|---|---|---|---|---|---|---|---|
| | | 1 | 2 | 3 | 4 | 5 | 6 | 7 | 8 | 9 | 10 | | |
| POLY (HEMICELLULOSE METHACRYLATE) | — | 10 | 20 | 30 | 40 | 50 | 60 | 70 | 80 | 90 | 100 | | |
| PMMA | — | 90 | 80 | 70 | 60 | 50 | 40 | 30 | 20 | 10 | 0 | PLA100% | |
| MOLDING CYCLE TIME | 8(s) OR LESS | 2 | 2 | 2 | 2 | 2 | 2 | 2 | 2 | 2 | 3 | 9 | MOLDING MACHINE |
| MOLDED PRODUCT DEFECT DENSITY | 100 OR LESS | 10 | 10 | 10 | 8 | 8 | 8 | 8 | 10 | 20 | 28 | 567 | KLA |
| MOLDED PRODUCT WEIGHT | 18 g OR LESS | 12 | 12 | 12 | 11 | 11 | 11 | 12 | 12 | 12 | 15 | 18 | WEIGHING DEVICE |
| HEAT-RESISTANT TEMPEPATURE | 120° C. OR MORE | 200 | 200 | 220 | 280 | 280 | 220 | 200 | 200 | 200 | 190 | 62 | ISO75 |
| TENSILE STRENGTH | 80 OR MORE | 99 | 99 | 99 | 100 | 100 | 100 | 103 | 103 | 100 | 90 | 59 | ISO527 |
| BENDING STRENGTH | 150 OR MORE | 170 | 170 | 170 | 190 | 190 | 190 | 175 | 175 | 175 | 160 | 90 | ISO178 |
| TRANSCRIPTION PROPERTIES | 100 nm OR LESS | 50 | 50 | 40 | 30 | 30 | 30 | 30 | 40 | 40 | 30 | 500,000 nm | SEM |
| TOTAL LIGHT TRANSMITTANCE | 92% OR MORE | 97 | 97 | 98 | 98 | 98 | 98 | 98 | 97 | 97 | 95 | 90 | ISO13468 |
| BIODEGRADATION RATE | 90% OR MORE | 99 | 99 | 9.9 | 100 | 100 | 100 | 100 | 100 | 100 | 98 | 0% | ISO19679 |

TABLE 8B

| EVALUATION ITEM | TARGET VALUE | EIGHTH B EMBODIMENT (ACETYL GROUP) | | | | | | | | |
|---|---|---|---|---|---|---|---|---|---|---|
| | | 11 | 12 | 13 | 14 | 15 | 16 | 17 | 18 | 19 |
| POLY (HEMICELLULOSE METHACRYLATE) | — | 10 | 20 | 30 | 40 | 50 | 60 | 70 | 80 | 90 |
| PC | — | 90 | 80 | 70 | 60 | 50 | 40 | 30 | 20 | 10 |
| MOLDING CYCLE TIME | 8(s) OR LESS | 2 | 2 | 2 | 2 | 2 | 2 | 2 | 2 | 2 |
| MOLDED PRODUCT DEFECT DENSITY | 100 OR LESS | 10 | 10 | 10 | 3 | 3 | 5 | 10 | 10 | 10 |
| MOLDED PRODUCT WEIGHT | 18 g OR LESS | 14 | 14 | 14 | 13 | 13 | 13 | 14 | 14 | 14 |
| HEAT-RESISTANT TEMPERATURE | 120° C. OR MORE | 200 | 200 | 215 | 270 | 270 | 245 | 200 | 200 | 197 |
| TENSILE STRENGTH | 80 OR MORE | 100 | 100 | 100 | 104 | 104 | 102 | 102 | 101 | 100 |
| BENDING STRENGTH | 150 OR MORE | 167 | 168 | 167 | 174 | 174 | 170 | 170 | 168 | 167 |
| TRANSCRIPTION PROPERTIES | 100 nm OR LESS | 40 | 40 | 40 | 30 | 30 | 38 | 45 | 50 | 50 |
| TOTAL LIGHT TRANSMITTANCE | 92% OR MORE | 96 | 96 | 95 | 96 | 96 | 96 | 97 | 97 | 96 |
| BIODEGRADATION RATE | 90% OR MORE | 100 | 100 | 100 | 100 | 100 | 100 | 100 | 100 | 99 |

TABLE 8C

| EVALUATION ITEM | TARGET VALUE | EIGHTH G EMBODIMENT (ACETYL GROUP) | | | | | | | | |
|---|---|---|---|---|---|---|---|---|---|---|
| | | 21 | 22 | 23 | 24 | 25 | 26 | 27 | 28 | 29 |
| POLY (HEMICELLULOSE METHACRYLATE) | — | 10 | 20 | 30 | 40 | 50 | 60 | 70 | 80 | 90 |
| PE | — | 90 | 80 | 701 | 60 | 50 | 40 | 30 | 20 | 10 |
| MOLDING CYCLE TIME | 8(s) OR LESS | 2 | 2 | 2 | 2 | 2 | 2 | 2 | 2 | 2 |
| MOLDED PRODUCT DEFECT DENSITY | 100 OR LESS | 10 | 10 | 101 | 8 | 8 | 10 | 10 | 10 | 10 |
| MOLDED PRODUCT WEIGHT | 18 g OR LESS | 14 | 14 | 14 | 13 | 13 | 13 | 14 | 14 | 14 |
| HEAT-RESISTANT TEMPERATURE | 120° C. OR MORE | 160 | 160 | 160 | 165 | 165 | 170 | 170 | 175 | 180 |
| TENSILE STRENGTH | 80 OR MORE | 95 | 95 | 95 | 95 | 95 | 95 | 96 | 95 | 95 |
| BENDING STRENGTH | 150 OR MORE | 170 | 170 | 170 | 170 | 170 | 175 | 168 | 165 | 165 |
| TRANSCRIPTION PROPERTIES | 100 nm OR LESS | 70 | 70 | 70 | 70 | 70 | 65 | 65 | 65 | 65 |
| TOTAL LIGHT TRANSMITTANCE | 92% OR MORE | 5 | 7 | 21 | 50 | 61 | 68 | 76 | 30 | 83 |
| BIODEGRADATION RATE | 90% OR MORE | 100 | 100 | 100 | 100 | 100 | 99 | 100 | 99 | 99 |

TABLE 8D

| EVALUATION ITEM | TARGET VALUE | EIGHTH D EMBODIMENT (ACETYL GROUP) | | | | | | | | |
|---|---|---|---|---|---|---|---|---|---|---|
| | | 31 | 32 | 33 | 34 | 35 | 36 | 37 | 38 | 39 |
| POLY (HEMICELLULOSE METHACRYLATE) | — | 10 | 20 | 30 | 40 | 50 | 60 | 70 | 80 | 90 |
| PP | — | 90 | 80 | 70 | 60 | 50 | 40 | 30 | 20 | 10 |
| MOLDING CYCLE TIME | 8(s) OR IFSS | 2 | 2 | 2 | 1 | 1 | 1 | 1 | 2 | 2 |
| MOLDED PRODUCT DEFECT DENSITY | 100 OR LESS | 10 | 10 | 10 | 7 | 7 | 10 | 10 | 15 | 15 |
| MOLDED PRODUCT WEIGHT | 18 g OR LESS | 14 | 13 | 13 | 13 | 13 | 13 | 13 | 14 | 14 |
| HEAT-RESISTANT TEMPERATURE | 120° C. OR MORE | 200 | 200 | 220 | 260 | 260 | 225 | 200 | 205 | 195 |
| TENSILE STRENGTH | 80 OR MORE | 95 | 95 | 100 | 100 | 100 | 105 | 105 | 100 | 100 |
| BENDING STRENGTH | 150 OR MORE | 173 | 175 | 178 | 178 | 178 | 175 | 170 | 170 | 168 |

TABLE 8D-continued

| | TARGET | EIGHTH D EMBODIMENT (ACETYL GROUP) | | | | | | | | |
|---|---|---|---|---|---|---|---|---|---|---|
| EVALUATION ITEM | VALUE | 31 | 32 | 33 | 34 | 35 | 36 | 37 | 38 | 39 |
| TRANSCRIPTION PROPERTIES | 100 nm OR LESS | 70 | 70 | 70 | 70 | 70 | 70 | 70 | 60 | 60 |
| TOTAL LIGHT TRANSMITTANCE | 92% OR MORE | 5 | 5 | 21 | 42 | 52 | 62 | 66 | 72 | 77 |
| BIODEGRADATION RATE | 90% OR MORE | 99 | 99 | 100 | 100 | 100 | 100 | 100 | 100 | 100 |

TABLE 8E

| | TARGET | EIGHTH E EMBODIMENT (ACETYL GROUP) | | | | | | | | |
|---|---|---|---|---|---|---|---|---|---|---|
| EVALUATION ITEM | VALUE | 41 | 42 | 43 | 44 | 45 | 46 | 47 | 48 | 49 |
| POLY (HEMICELLULOSE METHACRYLATE) | — | 10 | 20 | 30 | 40 | 50 | 60 | 70 | 80 | 90 |
| PFT | — | 90 | 80 | 70 | 60 | 50 | 40 | 30 | 20 | 10 |
| MOLDING CYCLE TIME | 8(s) OR LESS | 2 | 2 | 2 | 1 | 1 | 1 | 1 | 2 | 2 |
| MOI DFD PRODUCT DEFECT DENSITY | 100 OR LESS | 5 | 5 | 5 | 4 | 3 | 4 | 4 | 4 | 5 |
| MOLDED PRODUCT WEIGHT | 18 g OR LESS | 13 | 13 | 13 | 13 | 13 | 12 | 13 | 13 | 14 |
| HEAT-RESISTANT TEMPERATURE | 120° C. OR MORE | 200 | 200 | 220 | 270 | 270 | 260 | 250 | 200 | 200 |
| TENSILE STRENGTH | 80 OR MORE | 100 | 100 | 105 | 110 | 110 | 110 | 110 | 100 | 100 |
| BENDING STRENGTH | 150 OR MORE | 190 | 190 | 190 | 200 | 200 | 200 | 200 | 190 | 180 |
| TRANSCRIPTION PROPERTIES | 100 nm OR LESS | 50 | 50 | 40 | 20 | 20 | 25 | 30 | 30 | 40 |
| TOTAL LIGHT TRANSMITTANCE | 92% OR MORE | 97 | 97 | 97 | 97 | 97 | 97 | 97 | 97 | 97 |
| BIODEGRADATION RATE | 90% OR MORE | 100 | 100 | 100 | 100 | 100 | 100 | 100 | 100 | 100 |

TABLE 9A

| EVALUATION ITEM | TARGET VALUE | NINTH A EMBODIMENT (ACETONYL GROUP) | | | | | | | | | | COMPARATIVE EMBODIMENT | MEASUREMENT METHOD |
|---|---|---|---|---|---|---|---|---|---|---|---|---|---|
| | | 51 | 52 | 53 | 54 | 55 | 56 | 57 | 58 | 59 | 60 | | |
| POLY (HEMICELLULOSE METHACRYLATE) | — | 10 | 10 | 30 | 40 | 50 | 60 | 70 | 80 | 90 | 100 | | |
| PMMA | — | 90 | 80 | 70 | 60 | 50 | 40 | 30 | 20 | 10 | 0 | PLA100% | |
| MOLDING CYCLE TIME | 8(s) OR LESS | 2 | 2 | 2 | 2 | 2 | 2 | 2 | 2 | 2 | 3 | 9 | MOLDING MACHINE |
| FOLDED PRODUCT DEFECT DENSITY | 100 OR LESS | 10 | 10 | 10 | 8 | 8 | 8 | 8 | 10 | 20 | 28 | 567 | KLA |
| MOLDED PRODUCT WEIGHT | 18 g OR LESS | 12 | 12 | 11 | 11 | 11 | 11 | 12 | 12 | 17 | 15 | 18 | WEIGHING DEVICE |
| HEAT-RESISTANT TEMPERATURE | 120° C. OR MORE | 200 | 200 | 240 | 280 | 280 | 240 | 200 | 200 | 200 | 190 | 62 | ISO75 |
| TENSILE STRENGTH | 80 OR MORE | 99 | 99 | 100 | 100 | 100 | 100 | 103 | 103 | 100 | 90 | 59 | ISO527 |
| BENDING STRENGTH | 150 OR MORE | 170 | 170 | 180 | 190 | 190 | 190 | 175 | 175 | 175 | 165 | 90 | ISO178 |
| TRANSCRIPTION PROPERTIES | 100 nm OR LESS | 50 | 50 | 40 | 30 | 30 | 30 | 30 | 40 | 40 | 55 | 500,000 nm | SEM |
| TOTAL LIGHT TRANSMITTANCE | 92% OR MORE | 97 | 97 | 98 | 98 | 98 | 98 | 98 | 97 | 97 | 95 | 90 | ISO13468 |
| BIODEGRADATION RATE | 90% OR MORE | 99 | 99 | 100 | 100 | 100 | 100 | 99 | 99 | 99 | 98 | 0% | ISO19679 |

TABLE 9B

| EVALUATION ITEM | TARGET VALUE | NINTH B EMBODIMENT (ACETONYL GROUP) | | | | | | | | |
|---|---|---|---|---|---|---|---|---|---|---|
| | | 61 | 62 | 63 | 64 | 65 | 66 | 67 | 68 | 69 |
| POLY (HEMICELLULOSE METHACRYLATE) | — | 10 | 20 | 30 | 40 | 50 | 60 | 70 | 80 | 90 |
| PC | — | 90 | 80 | 70 | 60 | 50 | 40 | 30 | 20 | 10 |
| MOLDING CYCLE TIME | 8(s) OR LESS | 2 | 2 | 2 | 2 | 2 | 2 | 2 | 2 | 2 |
| MOLDED PRODUCT DEFECT DENSITY | 100 OR LESS | 10 | 10 | 5 | 3 | 3 | 5 | 10 | 10 | 10 |
| MOLDED PRODUCT WEIGHT | 18 g OR LESS | 14 | 14 | 14 | 13 | 13 | 13 | 14 | 14 | 14 |
| HEAT-RESISTANT TEMPERATURE | 120° C. OR MORE | 200 | 200 | 215 | 270 | 270 | 245 | 200 | 200 | 197 |
| TENSILE STRENGTH | 80 OR MORE | 100 | 100 | 103 | 104 | 104 | 103 | 102 | 101 | 100 |
| BENDING STRENGTH | 150 OR MORE | 167 | 168 | 167 | 174 | 174 | 170 | 170 | 168 | 167 |
| TRANSCRIPTION PROPERTIES | 100 nm OR LESS | 40 | 40 | 40 | 30 | 30 | 38 | 45 | 50 | 50 |
| TOTAL LIGHT TRANSMITTANCE | 92% OR MORE | 96 | 96 | 96 | 96 | 96 | 96 | 97 | 97 | 96 |
| BIODEGRADATION RATE | 90% OR MORE | 100 | 100 | 100 | 100 | 100 | 100 | 100 | 100 | 99 |

TABLE 9C

| EVALUATION ITEM | TARGET VALUE | NINTH C EMBODIMENT (ACETONYL GROUP) | | | | | | | | |
|---|---|---|---|---|---|---|---|---|---|---|
| | | 71 | 72 | 73 | 74 | 75: | 76 | 77 | 78 | 79 |
| POLY (HEMICELLULOSE METHACRYLATE) | — | 10 | 20 | 30 | 40 | 50 | 60 | 70 | 80 | 90 |
| PF | — | 90 | 86 | 70 | 60 | 50 | 40 | 30 | 20 | 10 |
| MOLDING CYCLE TIME | 8(s) OR LESS | 2 | 2 | 2 | 2 | 2 | 2 | 2 | 2 | 2 |
| MOLDED PRODUCT DEFECT DENSITY | 100 OR LESS | 10 | 10 | 10 | 8 | 8 | 10 | 10 | 10 | 10 |
| MOLDED PRODUCT WEIGHT | 18 g OR LESS | 14 | 14 | 14 | 13 | 13 | 13 | 14 | 14 | 14 |
| HEAT-RESISTANT TEMPERATURE | 120° C. OR MORE | 163 | 160 | 160 | 165 | 165 | 170 | 170 | 175 | 180 |
| TENSILE STRENGTH | 80 OR MORE | 95 | 95 | 95 | 95 | 95 | 95 | 96 | 95 | 95 |
| BENDING STRENGTH | 150 OR MORE | 170 | 170 | 170 | 170 | 170 | 175 | 168 | 165 | 165 |
| TRANSCRIPTION PROPERTIES | 100 nm OR LESS | 70 | 70 | 70 | 70 | 70 | 65 | 65 | 65 | 65 |
| TOTAL LIGHT TRANSMITTANCE | 92% OR MORE | 5 | 7 | 21 | 50 | 61 | 68 | 76 | 80 | 83 |
| BIODEGRADATION RATE | 90% OR MORE | 100 | 100 | 100 | 100 | 100 | 99 | 100 | 99 | 99 |

TABLE 9D

| EVALUATION ITEM | TARGET VALUE | NINTH D EMBODIMENT (ACETONYL GROUP) | | | | | | | | |
|---|---|---|---|---|---|---|---|---|---|---|
| | | 81 | 82 | 83 | 84 | 85 | 86 | 87 | 88 | 89 |
| POLY (HEMICELLULOSE METHACRYLATE) | — | 10 | 20 | 30 | 40 | 50 | 60 | 70 | 80 | 90 |
| PP | — | 90 | 80 | 70 | 60 | 50 | 40 | 80 | 20 | 10 |
| MOLDING CYCLE TIME | 8(s) OR LESS | 2 | 2 | 2 | 1 | 1 | 1 | 1 | 2 | 2 |
| MOLDED PRODUCT DEFECT DENSITY | 100 OR LESS | 10 | 10 | 10 | 7 | 7 | 10 | 10 | 15 | 15 |
| MOLDED PPODUCT WEIGHT | 18 g OR LESS | 14 | 13 | 13 | 13 | 13 | 13 | 13 | 14 | 14 |
| HEAT-RFSISTANT TEMPERATURE | 120° C. OR MORE | 200 | 200 | 220 | 260 | 260 | 225 | 200 | 205 | 195 |
| TENSILE STRENGTH | 80 OR MORE | 95 | 95 | 100 | 100 | 100 | 105 | 105 | 100 | 100 |
| BENDING STRENGTH | 150 OR MORE | 173 | 175 | 178 | 178 | 178 | 175 | 170 | 170 | 168 |
| TRANSCRIPTION PROPERTIES | 100 nm OR LESS | 70 | 70 | 70 | 70 | 70 | 70 | 70 | 50 | 60 |

TABLE 9D-continued

|  | TARGET | NINTH D EMBODIMENT (ACETONYL GROUP) | | | | | | | | |
|---|---|---|---|---|---|---|---|---|---|---|
| EVALUATION ITEM | VALUE | 81 | 82 | 83 | 84 | 85 | 86 | 87 | 88 | 89 |
| TOTAL LIGHT TRANSMITTANCE | 92% OR MORE | 5 | 5 | 21 | 42 | 52 | 62 | 66 | 72 | 77 |
| BIODEGRADATION RATE | 90% OR MORE | 99 | 99 | 100 | 100 | 100 | 100 | 100 | 100 | 100 |

TABLE 9E

|  | TARGET | NINTH E EMBODIMENT (ACETONYL GROUP) | | | | | | | | |
|---|---|---|---|---|---|---|---|---|---|---|
| EVALUATION ITEM | VALUE | 91 | 92 | 93 | 94 | 95 | 96 | 97 | 98 | 99 |
| POLY (HEMICELLULOSE METHACRYLATE) | — | 10 | 20 | 30 | 40 | 50 | 60 | 70 | 80 | 50 |
| PET | — | 90 | 80 | 70 | 60 | 50 | 40 | 30 | 20 | 10 |
| MOLDING CYCLE TIME | 8(s) OR LESS | 2 | 2 | 2 | 1 | 1 | 1 | 1 | 2 | 2 |
| MOLDED PRODUCT DEFECT DENSITY | 100 OR LESS | 5 | 5 | 5 | 4 | 3 | 4 | 4 | 4 | 5 |
| MOLDED PRODUCT WEIGHT | 18 g OR LESS | 13 | 13 | 13 | 13 | 13 | 12 | 13 | 13 | 14 |
| HEAT-RESISTANT TEMPERATURE | 120° C. OR MORE | 200 | 200 | 240 | 270 | 270 | 260 | 250 | 200 | 200 |
| TENSILE STRENGTH | 80 OR MORE | 100 | 100 | 110 | 115 | 115 | 110 | 105 | 100 | 100 |
| BENDING STRENGTH | 50 OR MORE | 190 | 190 | 198 | 200 | 200 | 200 | 190 | 190 | 180 |
| TRANSCRIPTION PROPERTIES | 100 nm OR LESS | 50 | 50 | 40 | 20 | 20 | 25 | 30 | 30 | 40 |
| TOTAL LIGHT TRANSMITTANCE | 92% OR MORE | 97 | 97 | 97 | 97 | 97 | 97 | 97 | 97 | 97 |
| BIODEGRADATION RATE | 90% OR MORE | 100 | 100 | 100 | 100 | 100 | 100 | 100 | 100 | 100 |

TABLE 10A

| EVALUATION ITEM | TARGET VALUE | TENTH A EMBODIMENT (CARBOXYL GROUP) | | | | | | | | | | COMPARATIVE EMBODIMENT | MEASUREMENT METHOD |
|---|---|---|---|---|---|---|---|---|---|---|---|---|---|
|  |  | 101 | 102 | 103 | 104 | 105 | 106 | 107 | 108 | 109 | 110 |  |  |
| POLY (HEMICELLULOSE METHACRYLATE) | — | 10 | 20 | 30 | 40 | 50 | 60 | 70 | 80 | 90 | 100 |  |  |
| PMMA | — | 90 | 80 | 70 | 60 | 50 | 40 | 80 | 20 | 10 | 0 | PLA100% |  |
| MOLDING CYCLE TIME | 8(s) OR LESS | 2 | 2 | 2 | 2 | 2 | 2 | 2 | 2 | 2 | 3 | 9 | MOLDING MACHINE |
| MOLDED PRODUCT DEFECT DENSITY | 100 OR LESS | 10 | 10 | 8 | 8 | 8 | 8 | 9 | 10 | 20 | 28 | 567 | KLA |
| MOLDED PRODUCT WEIGHT | 18 g OR LESS | 12 | 12 | 12 | 11 | 11 | 11 | 12 | 12 | 12 | 15 | 18 | WEIGTING DEVICE |
| HEAT-RESISTANT TEMPERATURE | 120° C. OR MORE | 200 | 200 | 220 | 280 | 280 | 220 | 200 | 200 | 000 | 192 | 62 | ISO75 |
| TENSILE STRENGTH | 80 OR MORE | 99 | 99 | 104 | 106 | 106 | 104 | 101 | 101 | 100 | 93 | 59 | ISO527 |
| BENDING STRENGTH | 50 OR MORE | 170 | 170 | 170 | 190 | 190 | 190 | 175 | 175 | 175 | 160 | 90 | ISO178 |
| TRANSCRIPTION PROPERTIES | 100 nm OR LESS | 50 | 50 | 40 | 30 | 30 | 30 | 30 | 40 | 40 | 55 | 500,000 nm | SEM |
| TOTAL LIGHT TRANSMITTANCE | 92% OR MORE | 97 | 97 | 98 | 98 | 98 | 98 | 98 | 97 | 97 | 95 | 90 | ISO13468 |
| BIODEGRADATION RATE | 90% OR MORE | 99 | 99 | 99 | 100 | 100 | 100 | 100 | 100 | 100 | 99 | 0% | ISO19679 |

TABLE 10B

| EVALUATION ITEM | TARGET VALUE | TENTH B EMBODIMENT (CARBOXYL GROUP) | | | | | | | | |
|---|---|---|---|---|---|---|---|---|---|---|
| | | 111 | 112 | 113 | 114 | 115 | 116 | 117 | 118 | 119 |
| POLY (HEMICELLULOSE METHACRYLATE) | — | 10 | 20 | 30 | 40 | 50 | 60 | 70 | 80 | 90 |
| PC | — | 90 | 80 | 70 | 60 | 50 | 40 | 30 | 20 | 10 |
| MOLDING CYCLE TIME | 8(s) OR LESS | 2 | 2 | 2 | 2 | 2 | 2 | 2 | 2 | 2 |
| MOLDED PRODUCT DEFECT DENSITY | 100 OR LESS | 10 | 10 | 10 | 3 | 3 | 5 | 10 | 10 | 10 |
| MOLDED PRODUCT WEIGHT | 18 g OR LESS | 14 | 14 | 14 | 13 | 13 | 13 | 14 | 14 | 14 |
| HEAT-RESISTANT TEMPERATURE | 120° C. OR MORE | 200 | 200 | 240 | 270 | 270 | 245 | 200 | 200 | 197 |
| TENSILE STRENGTH | 80 or MORE | 100 | 100 | 104 | 106 | 106 | 104 | 101 | 101 | 100 |
| BENDING STRENGTH | 150 OR MORE | 167 | 168 | 167 | 174 | 174 | 170 | 170 | 168 | 167 |
| TRANSCRIPTION PROPERTIES | 100 nm OR LESS | 40 | 40 | 30 | 30 | 30 | 35 | 45 | 50 | 50 |
| TOTAL LIGHT TRANSMITTANCE | 92% OR MORE | 96 | 96 | 96 | 96 | 96 | 96 | 97 | 97 | 96 |
| BIODEGRADATION RATE | 90% OR MORE | 100 | 100 | 100 | 100 | 100 | 100 | 100 | 100 | 99 |

TABLE 10C

| EVALUATION ITEM | TARGET VALUE | TENTH C EMBODIMENT (CARBOXYL GROUP) | | | | | | | | |
|---|---|---|---|---|---|---|---|---|---|---|
| | | 121 | 122 | 123 | 124 | 125 | 126 | 127 | 128 | 129 |
| POLY (HEMICELLULOSE METHACRYLATE) | — | 10 | 20 | 30 | 40 | 50 | 60 | 70 | 80 | 90 |
| PE | — | 90 | 80 | 70 | 60 | 50 | 40 | 30 | 20 | 10 |
| MOLDING CYCLE TIME | 8(s) OR LESS | 2 | 2 | 2 | 2 | 2 | 2 | 2 | 2 | 2 |
| MOLDED PRODUCT DEFECT DENSITY | 100 OR LESS | 10 | 10 | 10 | 8 | 8 | 10 | 10 | 10 | 10 |
| MOLDED PRODUCT WEIGHT | 18 g OR LESS | 14 | 14 | 14 | 13 | 13 | 13 | 14 | 14 | 14 |
| HEAT-RESISTANT TEMPERATURE | 120° C. OR MORE | 160 | 160 | 165 | 168 | 168 | 170 | 170 | 175 | 180 |
| TENSILE STRENGTH | 80 OR MORE | 95 | 95 | 95 | 95 | 95 | 95 | 96 | 95 | 95 |
| BENDING STRENGTH | 150 OR MORE | 170 | 170 | 175 | 178 | 178 | 175 | 168 | 165 | 165 |
| TRANSCRIPTION PROPERTIES | 100 nm OR LESS | 70 | 70 | 73 | 75 | 75 | 70 | 65 | 65 | 65 |
| TOTAL LIGHT TRANSMITTANCE | 92% OR MORE | 5 | 7 | 21 | 50 | 61 | 68 | 76 | 80 | 83 |
| BIODEGRADATION RATE | 90% OR MORE | 100 | 100 | 100 | 100 | 100 | 100 | 100 | 99 | 99 |

TABLE 10D

| EVALUATION ITEM | TARGET VALUE | TENTH D EMBODIMENT (CARBOXYL GROUP) | | | | | | | | |
|---|---|---|---|---|---|---|---|---|---|---|
| | | 131 | 132 | 133 | 134 | 135 | 136 | 137 | 138 | 139 |
| POLY (HEMICELLULOSE METHACRYLATE) | — | 10 | 20 | 30 | 40 | 50 | 60 | 70 | 80 | 90 |
| PP | — | 90 | 50 | 70 | 50 | 50 | 40 | 30 | 20 | 10 |
| MOLDING CYCLE TIME | 8(s) OR LESS | 2 | 2 | 2 | 1 | 1 | 1 | 1 | 2 | 2 |
| MOLDED PRODUCT DEFECT DENSITY | 100 OR LESS | 10 | 10 | 10 | 7 | 7 | 10 | 10 | 15 | 15 |
| MOLDED PRODUCT WEIGHT | 18 g OR LESS | 14 | 13 | 13 | 13 | 13 | 13 | 13 | 14 | 14 |
| HEAT-RESISTANT TEMPERATURE | 120° C. OR MORE | 200 | 200 | 220 | 260 | 260 | 225 | 200 | 205 | 195 |
| TENSILE STRENGTH | 80 OR MORE | 95 | 95 | 100 | 100 | 100 | 105 | 105 | 100 | 100 |
| BENDING STRENGTH | 150 OR MORE | 173 | 175 | 178 | 178 | 178 | 175 | 170 | 170 | 168 |
| TRANSCRIPTION PROPERTIES | 100 nm OR LESS | 70 | 70 | 70 | 70 | 70 | 70 | 70 | 60 | 60 |

TABLE 10D-continued

| EVALUATION ITEM | TARGET VALUE | TENTH D EMBODIMENT (CARBOXYL GROUP) | | | | | | | | |
|---|---|---|---|---|---|---|---|---|---|---|
| | | 131 | 132 | 133 | 134 | 135 | 136 | 137 | 138 | 139 |
| TOTAL LIGHT TRANSMITTANCE | 92% OR MORE | 5 | 5 | 21 | 42 | 52 | 62 | 66 | 72 | 77 |
| BIODEGRADATION RATE | 90% OR MORE | 99 | 99 | 100 | 100 | 100 | 100 | 100 | 100 | 100 |

TABLE 10E

| EVALUATION ITEM | TARGET VALUE | TENTH D EMBODIMENT (CARBOXYL GROUP) | | | | | | | | |
|---|---|---|---|---|---|---|---|---|---|---|
| | | 131 | 132 | 133 | 134 | 135 | 136 | 137 | 138 | 139 |
| POLY (HEMICELLULOSE METHACRYLATE) | — | 10 | 20 | 30 | 40 | 50 | 60 | 70 | 80 | 10 |
| PP | — | 90 | 80 | 70 | 60 | 50 | 40 | 30 | 20 | 10 |
| MOLDING CYCLE TIME | 8(s) OR LESS | 2 | 2 | 2 | 1 | 1 | 1 | 1 | 2 | 2 |
| MOLDED PRODUCT DEFECT DENSITY | 100 OR LESS | 10 | 10 | 10 | 7 | 7 | 10 | 10 | 15 | 15 |
| MOLDED PRODUCT WEIGHT | 18 g OR LESS | 14 | 13 | 13 | 13 | 13 | 13 | 13 | 14 | 14 |
| HEAT-RESISTANT TEMPERATURE | 120° C. OR MORE | 200 | 200 | 220 | 260 | 260 | 225 | 200 | 205 | 195 |
| TENSILE STRENGTH | 80 OR MORE | 95 | 95 | 100 | 100 | 100 | 105 | 105 | 100 | 100 |
| BENDING STRENGTH | 150 OR MORE | 173 | 175 | 178 | 178 | 178 | 175 | 170 | 170 | 168 |
| TRANSCRIPTION PROPERTIES | 100 nm OR LESS | 70 | 70 | 70 | 70 | 70 | 70 | 70 | 60 | 60 |
| TOTAL LIGHT TRANSMITTANCE | 92% OR MORE | 5 | 5 | 21 | 42 | 52 | 62 | 66 | 72 | 77 |
| BIODEGRADATION RATE | 90% OR MORE | 99 | 99 | 100 | 100 | 100 | 100 | 100 | 100 | 100 |

There are not large differences in the values of the evaluation items between Example 10 of the fifth A embodiment and Example 10 of the eighth A embodiment. There are not large differences in the values of the evaluation items between Example 60 of the sixth A embodiment and Example 60 of the ninth A embodiment. There are not large differences in the values of the evaluation items between Example 110 of the seventh A embodiment and Example 110 of the tenth A embodiment.

On the other hand, the samples produced from the resin compositions including 30 to 70 percent by weight of the first resin and 30 to 70 percent by weight of the second resin by foaming injection molding are understood to have shown good results. The samples produced from the hemicellulose polymer and the second resin by foaming injection molding were better not only in the injection molding-related evaluation items, such as the molding cycle time, but also in the items, such as heat-resistant temperature and tensile strength, than the samples produced from the hemicellulose polymer including acetyl groups and the second resin by injection molding.

Also, as is understood from comparisons between Tables of the fifth A to seventh E embodiments and Tables of the eighth A to tenth E embodiments, all the samples produced from the resin compositions including PMMA, PC, PE, PP, or PET as the second resin by foaming injection molding showed higher performance in the molding cycle time, molded product defect density, molded product weight, heat-resistant temperature, tensile strength, bending strength, transcription properties, total light transmittance, and biodegradation rate. From the results, it is particularly preferred to mold the resin composition of the present embodiment by foaming injection molding, which uses a gas.

While it has not been described as an embodiment, there is a technology that performs foam injection molding while supplying a foaming agent from the hopper along with resin pellets. It can be expected that the resin composition of the present embodiment will show higher performance even if the foaming agent is supplied from the hopper. Also, resin pellets including a foaming agent may be supplied. The foaming gas to be supplied into the resin pellets may be an inert gas typified by noble gases, such as nitrogen, helium, and argon, carbon dioxide, which is easily dissolved in thermoplastic resins and shows good plasticizer effects, a gas obtained by substituting fluorine for C1 to C5 saturated hydrocarbon or part thereof, or the like.

What is claimed is:

1. A resin composition for molding comprising a first resin that is derived from a plant having the structure of Formula 1:

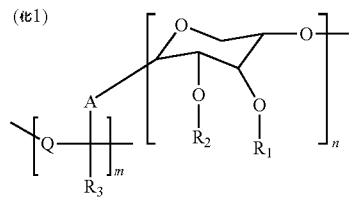

(#1)

wherein:
R1, and R2, are each independently selected from the group consisting of nitrogen, an alkyl group, an acetyl group, hydroxy group, an acyl group, an aldehyde group, an amino group, an imino group, an aryl group, a phosphonyl group, a propenyl group, a propanyl group, an acetonyl group, a carbonyl group, a carboxyl group, a cyano group, an azo group, an azi group, a thiol group, a sulfo group, a nitro group, a vinyl group, an allyl group, a cycloalkyl group, a phenyl group, a naphthyl group, an aralkyl group, a benzyl group, a Schiff group, an alkylene group, an amyl group, an acetamidomethyl group, an adamantyl group, an adamantyloxycarbonyl group, an allyloxycarbonyl group, a tert-butoxycarbonyl group, a benzyloxymethyl group, a biphenylisopropyloxycarbonyl group, a benzoyl group, a benzyloxycarbonyl group, a cyanoethyl group, a cyclohexyl group, a carboxymethyl group, a cyclopentadienyl group, a pentamethylcyclopentadienyl group, a cyclohexyl group, glucose, a hexyl group, an isobutyl group, an isopropyl group, a mesityl group, a trimethylphenyl group, a methoxymethyl group, a mesitylenesulfonyl group, a mesyl group, a nosyl group, an octadecylsilyl group, a pivaloyl group, a methoxybenzyl group, a methoxyphenyl group, a propyl group, an ethoxymethyl group, a trimethylsilyl group, a trimethylsilylethoxymethyl group, a siamyl group, a tert-butyl group, a tert-butyldimethylsilyl group, a tert-butyldiphenylsilyl group, a tert-butyldimethylsilyl group, a triethylsilyl group, a tetrahydropyranyl group, a triisopropylsilyl group, a trimethylsilyl group, a tolyl group, a tosyl group, a triisopropylbenzenesulfonyl group, a trityl group, a trichloroethoxycarbonyl group, a benzyloxycarbonyl group, a methylene group, a valeryl group, a methoxy group, an acetamide group, a trimethylammonium group, a diazo group, a hydrocarbon group, an ionized substituent group, fluorine, bromine, chlorine, iodine, and a substituent group thereof;

R3 is selected from the group consisting of hydrogen, nitrogen, an alkyl group, an acetyl group, hydroxy group, an acyl group, an aldehyde group, an amino group, an imino group, an aryl group, a phosphonyl group, a propenyl group, a propanyl group, an acetonyl group, a carbonyl group, a carboxyl group, a cyano group, an azo group, an azi group, a thiol group, a sulfo group, a nitro group, a vinyl group, an allyl group, a cycloalkyl group, a phenyl group, a naphthyl group, an aralkyl group, a benzyl group, a Schiff group, an alkylene group, an amyl group, an acetamidomethyl group, an adamantyl group, an adamantyloxycarbonyl group, an allyloxycarbonyl group, a tert-butoxycarbonyl group, a benzyloxymethyl group, a biphenylisopropyloxycarbonyl group, a benzoyl group, a benzyloxycarbonyl group, a cyanoethyl group, a cyclohexyl group, a carboxymethyl group, a cyclopentadienyl group, a pentamethylcyclopentadienyl group, a cyclohexyl group, glucose, a hexyl group, an isobutyl group, an isopropyl group, a mesityl group, a trimethylphenyl group, a methoxymethyl group, a mesitylenesulfonyl group, a mesyl group, a nosyl group, an octadecylsilyl group, a pivaloyl group, a methoxybenzyl group, a methoxyphenyl group, a propyl group, an ethoxymethyl group, a trimethylsilyl group, a trimethylsilylethoxymethyl group, a siamyl group, a tert-butyl group, a tert-butyldimethylsilyl group, a tert-butyldiphenylsilyl group, a tert-butyldimethylsilyl group, a triethylsilyl group, a tetrahydropyranyl group, a triisopropylsilyl group, a trimethylsilyl group, a tolyl group, a tosyl group, a triisopropylbenzenesulfonyl group, a trityl group, a trichloroethoxycarbonyl group, a benzyloxycarbonyl group, a methylene group, a valeryl group, a methoxy group, an acetamide group, a trimethylammonium group, a diazo group, a hydrocarbon group, an ionized substituent group, fluorine, bromine, chlorine, iodine, and a substituent group thereof;

A and Q are each independently selected from a single bond or a linking group;

n is an integer equal to or greater than 2; and m is an integer equal to or greater than 1.

2. The resin composition for molding of claim 1, further comprising a second resin having the structure of Formula 2:

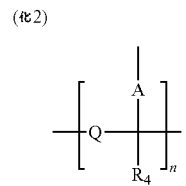

wherein:

R4 is selected from the group consisting of hydrogen, nitrogen, an alkyl group, an acetyl group, a hydroxy group, an acyl group, an aldehyde group, an amino group, an imino group, an aryl group, a phosphonyl group, a propenyl group, a propanyl group, an acetonyl group, a carbonyl group, a carboxyl group, a cyano group, an azo group, an azi group, a thiol group, a sulfo group, a nitro group, a vinyl group, an allyl group, a cycloalkyl group, a phenyl group, a naphthyl group, an aralkyl group, a benzyl group, a Schiff group, an alkylene group, an amyl group, an acetamidomethyl group, an adamantyl group, an adamantyloxycarbonyl group, an allyloxycarbonyl group, a tert-butoxycarbonyl group, a benzyloxymethyl group, a biphenylisopropyloxycarbonyl group, a benzoyl group, a benzyloxycarbonyl group, a cyanoethyl group, a cyclohexyl group, a carboxymethyl group, a cyclopentadienyl group, a pentamethylcyclopentadienyl group, a cyclohexyl group, glucose, a hexyl group, an isobutyl group, an isopropyl group, a mesityl group, a trimethylphenyl group, a methoxymethyl group, a mesitylenesulfonyl group, a mesyl group, a nosyl group, an octadecylsilyl group, a pivaloyl group, a methoxybenzyl group, a methoxyphenyl group, a propyl group, an ethoxymethyl group, a trimethylsilyl group, a trimethylsilylethoxymethyl group, a siamyl group, a tert-butyl group, a tert-butyldimethylsilyl group, a tert-butyldiphenylsilyl group, a tert-butyldimethylsilyl group, a triethylsilyl group, a tetrahydropyranyl group, a triisopropylsilyl group, a trimethylsilyl group, a tolyl group, a tosyl group, a triisopropylbenzenesulfonyl group, a trityl group, a trichloroethoxycarbonyl group, a benzyloxycarbonyl group, a methylene group, a valeryl group, a methoxy group, an acetamide group, a trimethylammonium group, a diazo group, a hydrocarbon group, an ionized substituent group, fluorine, bromine, chlorine, iodine, and a substituent group thereof;

A and Q are each independently selected from a single bond or a linking group; and n is an integer equal to or greater than 1.

3. The resin composition for molding of claim 2, wherein the resin composition comprises 10 to 90 percent by weight of the first resin and 90 to 10 percent by weight of the second resin.

4. The resin composition for molding of claim 1, further comprising a second resin selected from the group consisting of polycarbonate (PC), cyclo olefin polymer (COP), cyclo olefin copolymer (COC), polypropylene (PP), polyethylene (PE), polyethylene terephthalate (PET), polystyrene (PS), ABS resin (ABS), vinyl chloride (PVC), vinylidene chloride (PVDC), vinyl acetate (PVAC), polymethylpentene (PMP), polybutene (PB), hydroxybenzoic acid (HBP), polyetherimide (PEI), polyacetal (POM), polyphenylene ether (PPE), polyphenylene oxide (PPO), polyphenylene sulfide (PPS), polyurethane (PUR), ionomer resin (IO), fluorocarbon resin (FR), tetrafluoroethylene (PTFE), polycyclohexylenedimethylene terephthalate (PCT), polyethylene naphthalate (PEN), polyarylate (PAR), polyacrylonitrile (PAN), polyallylsulfone (PASF), polyamide (PA), polyvinyl alcohol (PVA), polymethacrylstyrene (MS), butadiene resin (BDR), polybutylene terephthalate (PBT), polyester carbonate (PPC), polybutylene succinate (PBS), norbornene resin (NB), polyamide (nylon) (PA), Teflon®, FRP, PHA, PHB, PHBH, CA, polyimide (PI), polyamideimide (PAI), polysulfone (PSF), polyethersulfone (PES), polyetheretherketone (PEEK), liquid crystal polymer (LCP), polychlorotrifluoroethylene (PCTFE), silicone resin (SI), epoxy resin (EP), wood powder, wood pellets, bamboo powder, bamboo pellets, grass powder, grass pellets, paper powder, and polylactic acid (PLA).

5. The resin composition for molding of claim 4, wherein the resin composition comprises 10 to 90 percent by weight of the first resin and 90 to 10 percent by weight of the second resin.

6. The resin composition for molding of claim 1, further comprising a second resin having the structure of Formula 3:

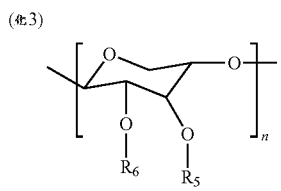

wherein:
R5 and R6 are each independently selected from the group consisting of nitrogen, an alkyl group, an acetyl group, a hydroxy group, an acyl group, an aldehyde group, an amino group, an imino group, an aryl group, a phosphonyl group, a propenyl group, a propanyl group, an acetonyl group, a carbonyl group, a carboxyl group, a cyano group, an azo group, an azi group, a thiol group, a sulfo group, a nitro group, a vinyl group, an allyl group, a cycloalkyl group, a phenyl group, a naphthyl group, an aralkyl group, a benzyl group, a Schiff group, an alkylene group, an amyl group, an acetamidomethyl group, an adamantyl group, an adamantyloxycarbonyl group, an allyloxycarbonyl group, a tert-butoxycarbonyl group, a benzyloxymethyl group, a biphenylisopropyloxycarbonyl group, a benzoyl group, a benzyloxycarbonyl group, a cyanoethyl group, a cyclohexyl group, a carboxymethyl group, a cyclopentadienyl group, a pentamethylcyclopentadienyl group, a cyclohexyl group, glucose, a hexyl group, an isobutyl group, an isopropyl group, a mesityl group, a trimethylphenyl group, a methoxymethyl group, a mesitylenesulfonyl group, a mesyl group, a nosyl group, an octadecylsilyl group, a pivaloyl group, a methoxybenzyl group, a methoxyphenyl group, a propyl group, an ethoxymethyl group, a trimethylsilyl group, a trimethylsilylethoxymethyl group, a siamyl group, a tert-butyl group, a tert-butyldimethylsilyl group, a tert-butyldiphenylsilyl group, a tert-butyldimethylsilyl group, a triethylsilyl group, a tetrahydropyranyl group, a triisopropylsilyl group, a trimethylsilyl group, a tolyl group, a tosyl group, a triisopropylbenzenesulfonyl group, a trityl group, a trichloroethoxycarbonyl group, a benzyloxycarbonyl group, a methylene group, a valeryl group, a methoxy group, an acetamide group, a trimethylammonium group, a diazo group, a hydrocarbon group, an ionized substituent group, fluorine, bromine, chlorine, iodine, and a substituent group thereof; and n is an integer equal to or greater than 2.

7. The resin composition for molding of claim 6, wherein the resin composition comprises 10 to 90 percent by weight of the first resin and 90 to 10 percent by weight of the second resin.

8. The resin composition for molding of claim 1, wherein one or both of R1 and R2 is selected from the group consisting of an acetyl group, an acetonyl group, and a carboxyl group, the second resin comprises one or more from the group consisting of polymethyl methacrylate, polycarbonate, polyethylene, polypropylene and polyethylene terephthalate, and the resin composition comprises 10 to 90 percent by weight of the first resin and 90 to 10 percent by weight of the second resin.

9. A method of molding a product from a resin composition comprising the steps of:
charging the resin composition of claim 1 into a resin injector with the resin composition solidified;
liquidizing the resin composition in the resin injector by heating and compressing the resin composition;
injecting the liquidized resin composition from the resin injector into a mold by pressing the resin composition; and
cooling and solidifying the resin composition in the mold and extracting a molded product from the mold.

10. The method of molding of claim 9, further comprising a step of introducing and dispersing a gas into the liquidized resin composition.

11. The method of molding of claim 9, wherein the resin composition further comprises a second resin having the structure of Formula 2:

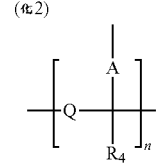

wherein:
R4 is selected from the group consisting of hydrogen, nitrogen, an alkyl group, an acetyl group, a hydroxy group, an acyl group, an aldehyde group, an amino group, an imino group, an aryl group, a phosphonyl group, a propenyl group, a propanyl group, an acetonyl group, a carbonyl group, a carboxyl group, a cyano group, an azo group, an azi group, a thiol group, a sulfo group, a nitro group, a vinyl group, an allyl group, a cycloalkyl group, a phenyl group, a naphthyl group, an aralkyl group, a benzyl group, a Schiff group, an alkylene group, an amyl group, an acetamidomethyl group, an adamantyl group, an adamantyloxycarbonyl group, an allyloxycarbonyl group, a tert-butoxycarbonyl group, a benzyloxymethyl group, a biphenylisopropyloxycarbonyl group, a benzoyl group, a benzyloxycarbonyl group, a cyanoethyl group, a cyclohexyl group, a carboxymethyl group, a cyclopentadienyl group, a pentamethylcyclopentadienyl group, a cyclohexyl group, glucose, a hexyl group, an isobutyl group, an isopropyl group, a mesityl group, a trimethylphenyl group, a methoxymethyl group, a mesitylenesulfonyl group, a mesyl group, a nosyl group, an octadecylsilyl group, a pivaloyl group, a methoxybenzyl group, a methoxyphenyl group, a propyl group, an ethoxymethyl group, a trimethylsilyl group, a trimethylsilylethoxymethyl group, a siamyl group, a tert-butyl group, a tert-butyldimethylsilyl group, a tert-butyldiphenylsilyl group, a tert-butyldimethylsilyl group, a triethylsilyl group, a tetrahydropyranyl group, a triisopropylsilyl group, a trimethylsilyl group, a tolyl group, a tosyl group, a triisopropylbenzenesulfonyl group, a trityl group, a trichloroethoxycarbonyl group, a benzyloxycarbonyl group, a methylene group, a valeryl group, a methoxy group, an acetamide group, a trimethylammonium group, a diazo group, a hydrocarbon group, an ionized substituent group, fluorine, bromine, chlorine, iodine, and a substituent group thereof;

A and Q are each independently selected from a single bond or a linking group; and n is an integer equal to or greater than 1.

12. The method of molding of claim 11, wherein the resin composition comprises 10 to 90 percent by weight of the first resin and 90 to 10 percent by weight of the second resin.

13. The method of molding of claim 11, further comprising a step of introducing and dispersing a gas into the liquidized resin composition.

14. The method of molding of claim 9, wherein the resin composition further comprises a second resin selected from the group consisting of polycarbonate (PC), cyclo olefin polymer (COP), cyclo olefin copolymer (COC), polypropylene (PP), polyethylene (PE), polyethylene terephthalate (PET), polystyrene (PS), ABS resin (ABS), vinyl chloride (PVC), vinylidene chloride (PVDC), vinyl acetate (PVAC), polymethylpentene (PMP), polybutene (PB), hydroxybenzoic acid (HBP), polyetherimide (PEI), polyacetal (POM), polyphenylene ether (PPE), polyphenylene oxide (PPO), polyphenylene sulfide (PPS), polyurethane (PUR), ionomer resin (IO), fluorocarbon resin (FR), tetrafluoroethylene (PTFE), polycyclohexylenedimethylene terephthalate (PCT), polyethylene naphthalate (PEN), polyarylate (PAR), polyacrylonitrile (PAN), polyallylsulfone (PASF), polyamide (PA), polyvinyl alcohol (PVA), polymethacrylstyrene (MS), butadiene resin (BDR), polybutylene terephthalate (PBT), polyester carbonate (PPC), polybutylene succinate (PBS), norbornene resin (NB), polyamide (nylon) (PA), Teflon®, FRP, PHA, PHB, PHBH, CA, polyimide (PI), polyamideimide (PAI), polysulfone (PSF), polyethersulfone (PES), polyetheretherketone (PEEK), liquid crystal polymer (LCP), polychlorotrifluoroethylene (PCTFE), silicone resin (SI), epoxy resin (EP), wood powder, wood pellets, bamboo powder, bamboo pellets, grass powder, grass pellets, paper powder, and polylactic acid (PLA).

15. The method of molding of claim 14, wherein the resin composition comprises 10 to 90 percent by weight of the first resin and 90 to 10 percent by weight of the second resin.

16. The method of molding of claim 14, further comprising a step of introducing and dispersing a gas into the liquidized resin composition.

17. The resin composition for molding of claim 9, wherein the resin composition further comprises a second resin having the structure of Formula 3:

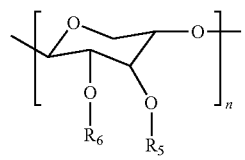

(化3)

wherein:
R5 and R6 are each independently selected from the group consisting of hydrogen, nitrogen, an alkyl group, an acetyl group, a hydroxy group, an acyl group, an aldehyde group, an amino group, an imino group, an aryl group, a phosphonyl group, a propenyl group, a propanyl group, an acetonyl group, a carbonyl group, a carboxyl group, a cyano group, an azo group, an azi group, a thiol group, a sulfo group, a nitro group, a vinyl group, an allyl group, a cycloalkyl group, a phenyl group, a naphthyl group, an aralkyl group, a benzyl group, a Schiff group, an alkylene group, an amyl group, an acetamidomethyl group, an adamantyl group, an adamantyloxycarbonyl group, an allyloxycarbonyl group, a tert-butoxycarbonyl group, a benzyloxymethyl group, a biphenylisopropyloxycarbonyl group, a benzoyl group, a benzyloxycarbonyl group, a cyanoethyl group, a cyclohexyl group, a carboxymethyl group, a cyclopentadienyl group, a pentamethylcyclopentadienyl group, a cyclohexyl group, glucose, a hexyl group, an isobutyl group, an isopropyl group, a mesityl group, a trimethylphenyl group, a methoxymethyl group, a mesitylenesulfonyl group, a mesyl group, a nosyl group, an octadecylsilyl group, a pivaloyl group, a methoxybenzyl group, a methoxyphenyl group, a propyl group, an ethoxymethyl group, a trimethylsilyl group, a trimethylsilylethoxymethyl group, a siamyl group, a tert-butyl group, a tert-butyldimethylsilyl group, a tert-butyldiphenylsilyl group, a tert-butyldimethylsilyl group, a triethylsilyl group, a tetrahydropyranyl group, a triisopropylsilyl group, a trimethylsilyl group, a tolyl group, a tosyl group, a triisopropylbenzenesulfonyl group, a trityl group, a trichloroethoxycarbonyl group, a benzyloxycarbonyl group, a methylene group, a valeryl group, a methoxy group, an acetamide group, a trimethylammonium group, a diazo group, a hydrocarbon group, an ionized substituent group, fluorine, bromine, chlorine, iodine, and a substituent group thereof;

n is an integer equal to or greater than 2.

18. The method of molding of claim 17, wherein the resin composition comprises 10 to 90 percent by weight of the first resin and 90 to 10 percent by weight of the second resin.

19. The method of molding of claim 17, further comprising a step of introducing and dispersing a gas into the liquidized resin composition.

20. The method of molding of claim 9, wherein
one or both of R1 and R2 is selected from the group consisting of an acetyl group, an acetonyl group, and a carboxyl group,
the second resin comprises one or more selected from the group consisting of polymethyl methacrylate, polycarbonate, polyethylene, polypropylene and polyethylene terephthalate, and
the resin composition comprises 10 to 90 percent by weight of the first resin and 90 to 10 percent by weight of the second resin.

* * * * *